US011222361B2

(12) United States Patent
Wolfe et al.

(10) Patent No.: US 11,222,361 B2
(45) Date of Patent: *Jan. 11, 2022

(54) LOCATION-BASED BOOK IDENTIFICATION

(71) Applicant: Squirl, Inc., Houston, TX (US)

(72) Inventors: Serie L. Wolfe, Houston, TX (US); Jef Van der Avoort, Vosselaar (BE)

(73) Assignee: Squirl, Inc., Houston, TX (US)

( * ) Notice: Subject to any disclaimer, the term of this patent is extended or adjusted under 35 U.S.C. 154(b) by 203 days.

This patent is subject to a terminal disclaimer.

(21) Appl. No.: 16/139,016

(22) Filed: Sep. 22, 2018

(65) Prior Publication Data
US 2019/0034971 A1    Jan. 31, 2019

Related U.S. Application Data

(63) Continuation of application No. 14/228,117, filed on Mar. 27, 2014, now Pat. No. 10,140,632.

(51) Int. Cl.
*G06Q 30/02* (2012.01)
*H04W 4/02* (2018.01)
*G06Q 50/00* (2012.01)
*H04L 29/12* (2006.01)

(52) U.S. Cl.
CPC ..... *G06Q 30/0267* (2013.01); *G06Q 30/0261* (2013.01); *G06Q 50/01* (2013.01); *H04W 4/023* (2013.01); *H04L 61/609* (2013.01)

(58) Field of Classification Search
CPC .......... G06Q 30/0267; G06Q 30/0261; G06Q 50/01; H04W 4/023; H04L 61/609
USPC ................. 715/234, 232, 231, 200
See application file for complete search history.

(56) References Cited

U.S. PATENT DOCUMENTS

| 7,788,134 B1 | 8/2010 | Manber |
| 7,937,469 B2 | 5/2011 | Hamada et al. |
| 8,510,247 B1 | 8/2013 | Kane, Jr. et al. |

(Continued)

FOREIGN PATENT DOCUMENTS

KR    101087950 B1    11/2011

OTHER PUBLICATIONS

Projekt Ingeborg, Retrieved on: Mar. 26, 2014, Available at: http://pingeb.org/, 2 pages.

(Continued)

*Primary Examiner* — Manglesh M Patel
(74) *Attorney, Agent, or Firm* — Wade IP Law PLLC

(57) ABSTRACT

Techniques are described herein that are capable of performing location-based book identification. For example, book(s) may be identified that discuss a location that is within a designated proximity to a mobile device. In accordance with this example, information regarding the book(s) may be provided for consumption by a user at the mobile device. For instance, the information may be displayed on the mobile device in response to the mobile device coming within the designated proximity to the location. The information may include an excerpt of at least one of the book(s), an indication of other location(s) that are discussed by at least one of the book(s), an offer to purchase at least one of the book(s), etc. The user may share the information through social media, interact with other readers and/or the author via a social network, etc.

21 Claims, 12 Drawing Sheets

(56) References Cited

U.S. PATENT DOCUMENTS

| | | | | |
|---|---|---|---|---|
| 8,650,072 | B2* | 2/2014 | Mason | G06Q 30/02 |
| | | | | 705/14.1 |
| 9,317,173 | B2 | 4/2016 | Singer | |
| 9,426,232 | B1* | 8/2016 | Wilden | H04L 67/02 |
| 2007/0161382 | A1* | 7/2007 | Melinger | H04L 67/18 |
| | | | | 455/456.1 |
| 2009/0106037 | A1 | 4/2009 | Harindranath | |
| 2009/0307067 | A1* | 12/2009 | Obermeyer | G06Q 30/0601 |
| | | | | 705/14.1 |
| 2011/0191432 | A1* | 8/2011 | Layson, Jr. | H04M 3/42382 |
| | | | | 709/206 |
| 2011/0191662 | A1* | 8/2011 | Poteet, II | G06F 17/00 |
| | | | | 715/202 |
| 2011/0313874 | A1 | 12/2011 | Hardie | |
| 2012/0054005 | A1 | 3/2012 | Manning et al. | |
| 2012/0154372 | A1 | 6/2012 | Buck | |
| 2012/0190386 | A1 | 7/2012 | Anderson | |
| 2012/0300089 | A1* | 11/2012 | Sbaiz | G06K 9/00671 |
| | | | | 348/222.1 |
| 2012/0324393 | A1 | 12/2012 | Mbenkum et al. | |
| 2013/0080881 | A1 | 3/2013 | Goodspeed | |
| 2013/0339345 | A1 | 12/2013 | Soto Matamala | |
| 2014/0244155 | A1 | 8/2014 | Abe | |
| 2014/0282205 | A1 | 9/2014 | Teplitsky | |
| 2016/0343019 | A1* | 11/2016 | Postrel | G06Q 30/0259 |
| 2021/0127232 | A1* | 4/2021 | Zimroni | H04W 4/021 |

OTHER PUBLICATIONS

"What is Project Ingeborg?", Retrieved on: Mar. 27, 2014, Available at: https://github.com/salendron/Pingeborg/wiki/What-is-Project-Ingeborg%3F, 4 pages.

"Projekt pineb.org", Retrieved on: Mar. 27, 2014, Available at: http://www.youtube.com/watch?v=cDUaD7Lgw84&feature=youtu.be, 2 pages.

"Google Play Books update adds definitions, translations, and Maps integrations", Retrieved on: Mar. 27, 2014, Available at: http://www.theverge.com/2012/9/25/3386184/google-play-books-app-update-android-maps-translation-dictionary, 5 pages.

"Placing Literature: Where Your Book Meets the Map", Retrieved on: Mar. 27, 2014, Available at: http://www.placingliterature.com/home, 2 pages.

"Pinbooks, Dein Buch zur Stadt", Retrieved on: Mar. 27, 2014, Available at: http://www.pinbooks.de/index.html, 1 page.

"Google Book Search, Books:Mapped", Retrieved on: Mar. 27, 2014, Available at: http://booksearch.blogspot.com/2007/01/books-mapped.html, 2 pages.

"Google Book Search in Google Earth", Retrieved on: Mar. 27, 2014, Available at: http://google-latlong.blogspot.dk/2007/08/google-book-search-in-google-earth.html, 1 page.

"Books Set In . . . ", Retrieved on: Mar. 27, 2014, Available at: http://www.bookssetin.com/, 1 page.

"49th Shelf", Retrieved on: Mar. 27, 2014, Available at: http://49thshelf.com/map, 4 pages.

"iTunes Preview, Novels: On Location", Retrieved on: Mar. 27, 2014, Available at: https://itunes.apple.com/us/app/novels-on-location/id625973663, 2 pages.

"Litmap", Retrieved on: Mar. 27, 2014, Available at: http://barbarahui.net/the-litmap-project/, 3 pages.

"Litmap (beta)", Retrieved on: Mar. 27, 2014, Available at: http://barbarahui.net/litmap/#, 1 page.

"Small Demons—Welcome to the Storyverse", Retrieved on: Mar. 27, 2014, Available at: https://www.smalldemons.com/, 3 pages.

"Enter The Storyverse: An Index for People, Places, and Things Mentioned in Books", Retrieved on: Mar. 27, 2014, Available at: http://www.fastcompany.com/3000094/enter-storyverse-index-people-places-and-things-mentioned-books, 6 pages.

"International Search Report and Written Opinion" issued in International Patent Application No. PCT/US2014/060187, dated Feb. 4, 2015, 11 Pages.

International Preliminary Report on Patentability issued in International Patent Application No. PCT/US2014/060187, dated Mar. 31, 2016, 11 Pages.

Solveig et al., "Design and Evaluation of a Location-Based Mobile News Reader," IEEE Department or Information Science and Media Studies, University of Bergen—Norway, 2011. [retrieved on Dec. 12, 2014]. Retrived from the Internet: <URL: http://ieeexplore.ieee.org/xpl/login.jsp?tp=&arnumber=5720634&url=http%3A%2F%2Fieeexplore.ieee.org%2Fxpls%2Fabs_all.jsp%3Farnumber%3D5720634>, 4 pages.

* cited by examiner

LOCATION-BASED BOOK IDENTIFICATION

CROSS-REFERENCE TO RELATED APPLICATION(S)

This application is a continuation of U.S. patent application Ser. No. 14/228,117, entitled "PROVIDING INFORMATION REGARDING BOOK(S) HAVING SCENE(S) IN LOCATION(S) WITHIN PROXIMITY TO A MOBILE DEVICE," filed Mar. 27, 2014, which is incorporated herein by reference in its entirety.

BACKGROUND

Authors often face challenges in bringing their books to market, especially authors who are not well known in the publishing industry. Competition for exposure is fierce, and standing out from other authors typically takes luck and/or a relatively substantial marketing budget. Readers often miss opportunities to read good books because the readers are unaware that the books exist. The selection of books that is known to the reading audience traditionally is limited primarily to books that are written by well-known authors or that are heavily marketed by publishing companies. Accordingly, authors who are not well known or supported by a publishing company are often at a disadvantage for attracting readers to their books.

Moreover, traditional avenues for selling books typically do not engage readers with the content of the books. For instance, a user may walk into a book shop and search for a book on a particular topic or by a particular author. Alternatively, a user may perform a search online (e.g., on Amazon.com®) using keywords to find a book. In accordance with these avenues, the user may be allowed to see excerpts that include content from a book before making a decision whether to purchase the book. However, the user typically has no connection with the content that would serve to engage the user with the content.

SUMMARY

Various approaches are described herein for, among other things, performing location-based book identification. For example, book(s) may be identified that discuss a location that is within a designated proximity to a mobile device. In accordance with this example, information regarding the book(s) may be provided for consumption by a user at the mobile device. For instance, the information may be displayed on the mobile device in response to the mobile device coming within the designated proximity to the location. The information may include an excerpt of at least one of the book(s), an indication of other location(s) that are discussed by at least one of the book(s), an offer to purchase at least one of the book(s), etc. The user may share the information through social media, interact with other readers and/or the author via a social network, etc. The information and/or data upon which the book(s) are identified may be crowd sourced.

Example methods are described. A first example method includes detecting that a mobile device is within a designated proximity to a location. Book(s) that discuss the location are identified. Information regarding at least one book that is included in the book(s) is provided via a user interface that is associated with the mobile device based on the at least one book discussing the location.

A second example method includes detecting that mobile devices are within a designated proximity to a location. Books that discuss the location are identified. First information regarding a first subset of the books is provided via a first user interface that is associated with a first mobile device based on each book in the first subset discussing the location and further based on each book in the first subset corresponding to a first attribute that is included in a first user profile of a first user of the first mobile device. Second information regarding a second subset of the books is provided via a second user interface that is associated with a second mobile device based on each book in the second subset discussing the location and further based on each book in the second subset corresponding to a second attribute that is included in a second user profile of a second user of the second mobile device.

Example systems are also described. A first example system includes detection logic, identification logic, and provision logic. The detection logic is configured to detect whether a mobile device is within a designated proximity to a location. The identification logic is configured to identify book(s) that discuss the location in response to a determination that the mobile device is within the designated proximity to the location. The provision logic is configured to provide information regarding at least one book that is included in the book(s) via a user interface that is associated with the mobile device based on the at least one book discussing the location.

A second example system includes detection logic, identification logic, and provision logic. The detection logic is configured to detect whether mobile devices are within a designated proximity to a location. The identification logic is configured to identify books that discuss the location. The provision logic is configured to provide first information regarding a first subset of the books via a first user interface that is associated with a first mobile device, in response to detection that the mobile devices are within the designated proximity to the location, based on each book in the first subset discussing the location and further based on each book in the first subset corresponding to a first attribute that is included in a first user profile of a first user of the first mobile device. The provision logic is further configured to provide second information regarding a second subset of the books via a second user interface that is associated with a second mobile device, in response to detection that the mobile devices are within the designated proximity to the location, based on each book in the second subset discussing the location and further based on each book in the second subset corresponding to a second attribute that is included in a second user profile of a second user of the second mobile device.

Example computer program products are also described. A first example computer program product includes a computer-readable medium having computer program logic recorded thereon for enabling a processor-based system to perform location-based book identification. The computer program logic includes a first program logic module, a second program logic module, and a third program logic module. The first program logic module is for enabling the processor-based system to detect whether a mobile device is within a designated proximity to a location. The second program logic module is for enabling the processor-based system to identify book(s) that discuss the location in response to a determination that the mobile device is within the designated proximity to the location. The third program logic module is for enabling the processor-based system to provide information regarding at least one book that is included in the book(s) via a user interface that is associated with the mobile device based on the at least one book discussing the location.

A second example computer program product includes a computer-readable medium having computer program logic recorded thereon for enabling a processor-based system to perform location-based book identification. The computer program logic includes a first program logic module, a second program logic module, and a third program logic module. The first program logic module is for enabling the processor-based system to detect whether mobile devices are within a designated proximity to a location. The second program logic module is for enabling the processor-based system to identify books that discuss the location. The third program logic module is for enabling the processor-based system to provide first information regarding a first subset of the books via a first user interface that is associated with a first mobile device, in response to detection that the mobile devices are within the designated proximity to the location, based on each book in the first subset discussing the location and further based on each book in the first subset corresponding to a first attribute that is included in a first user profile of a first user of the first mobile device. The third program logic module is further for enabling the processor-based system to provide second information regarding a second subset of the books via a second user interface that is associated with a second mobile device, in response to detection that the mobile devices are within the designated proximity to the location, based on each book in the second subset discussing the location and further based on each book in the second subset corresponding to a second attribute that is included in a second user profile of a second user of the second mobile device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the invention is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles involved and to enable a person skilled in the relevant art(s) to make and use the disclosed technologies.

Figure 9:
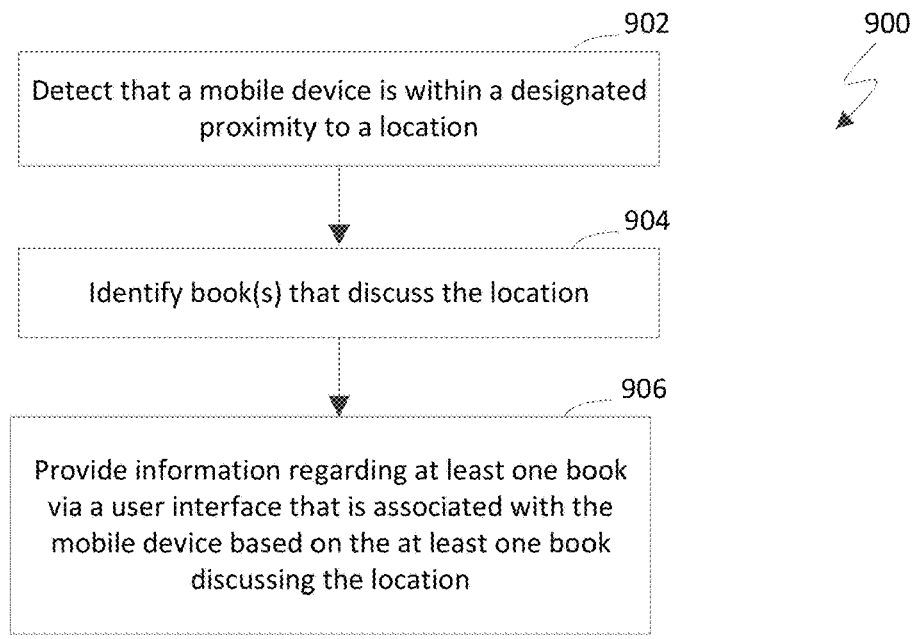
Figure 11:
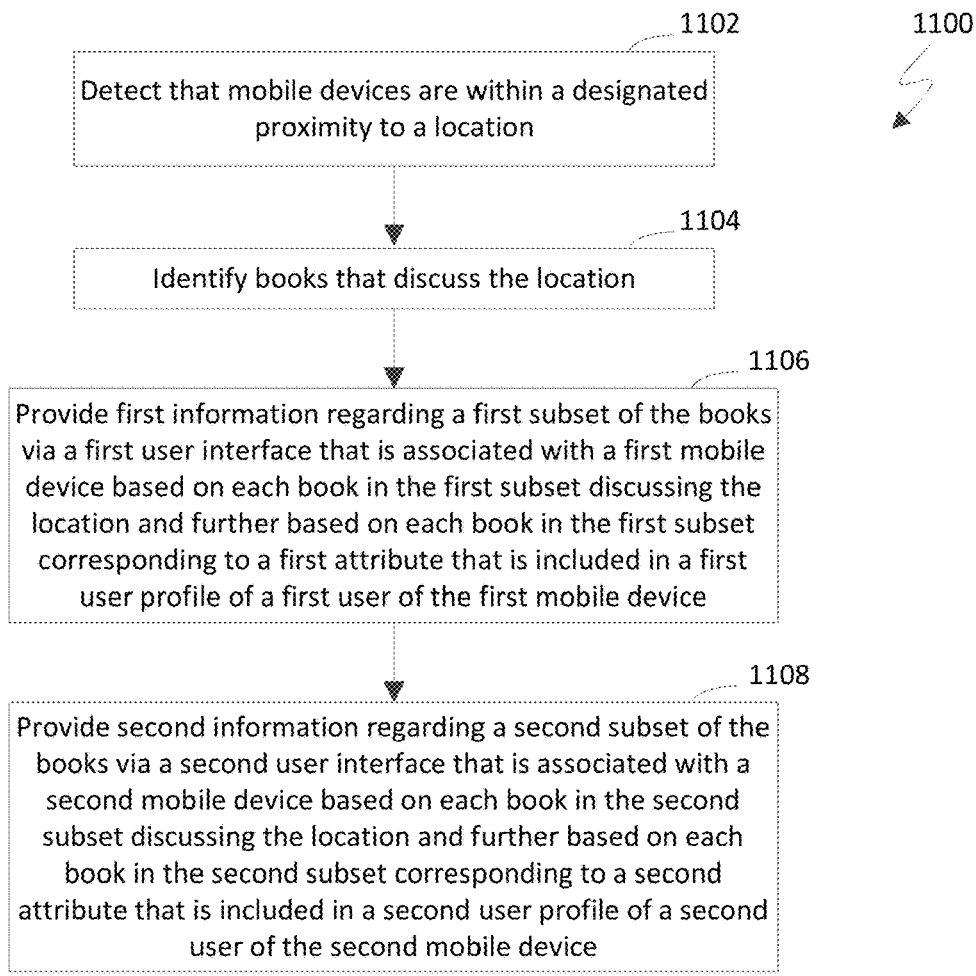
Figure 13:
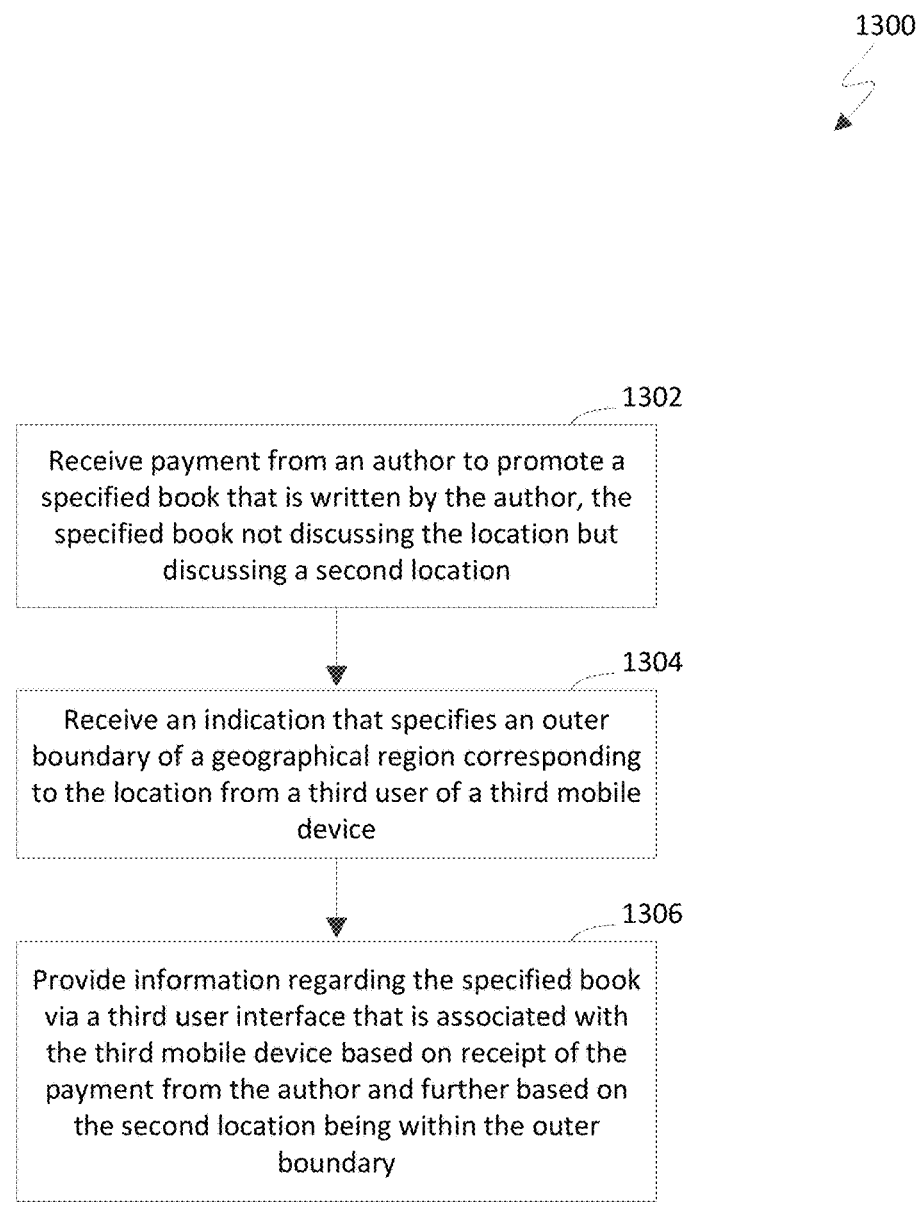

FIGS. 9, 11, and 13 depict flowcharts of example methods for performing location-based book identification in accordance with embodiments.

Figure 10:
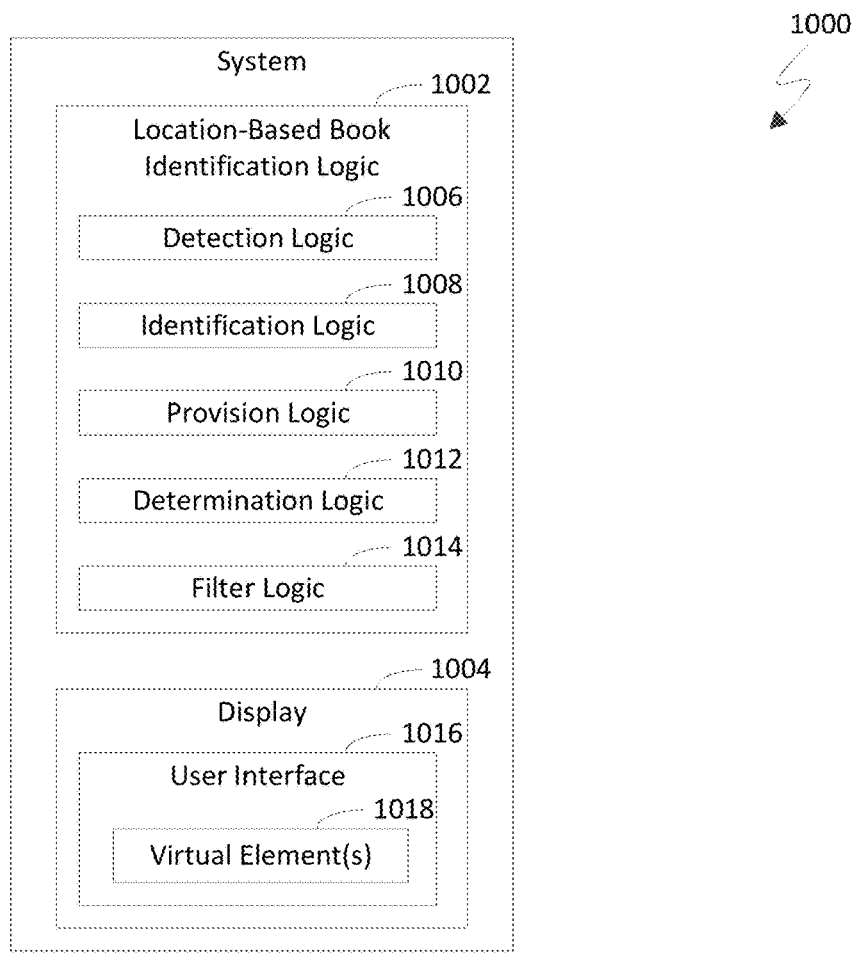
Figure 12:
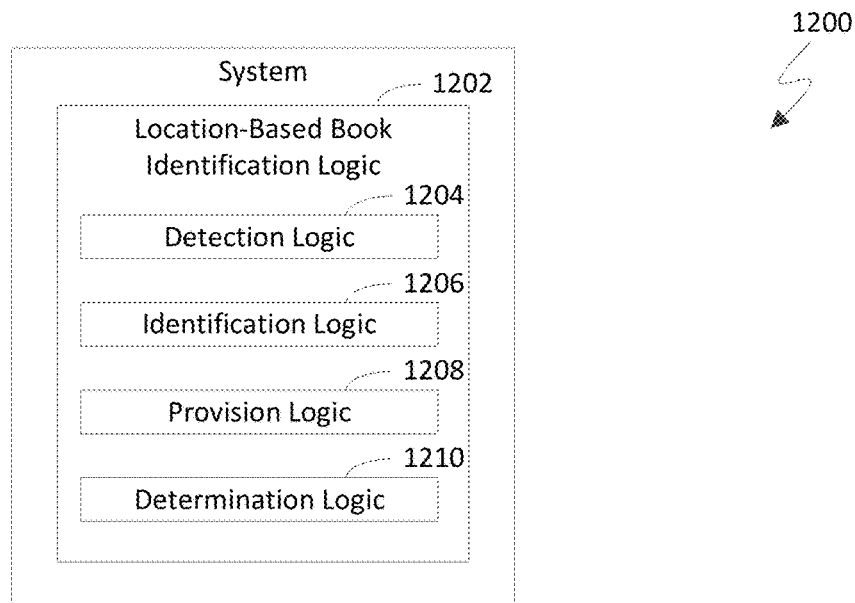

FIGS. 10 and 12 are block diagrams of example systems in accordance with embodiments.

Figure 14:
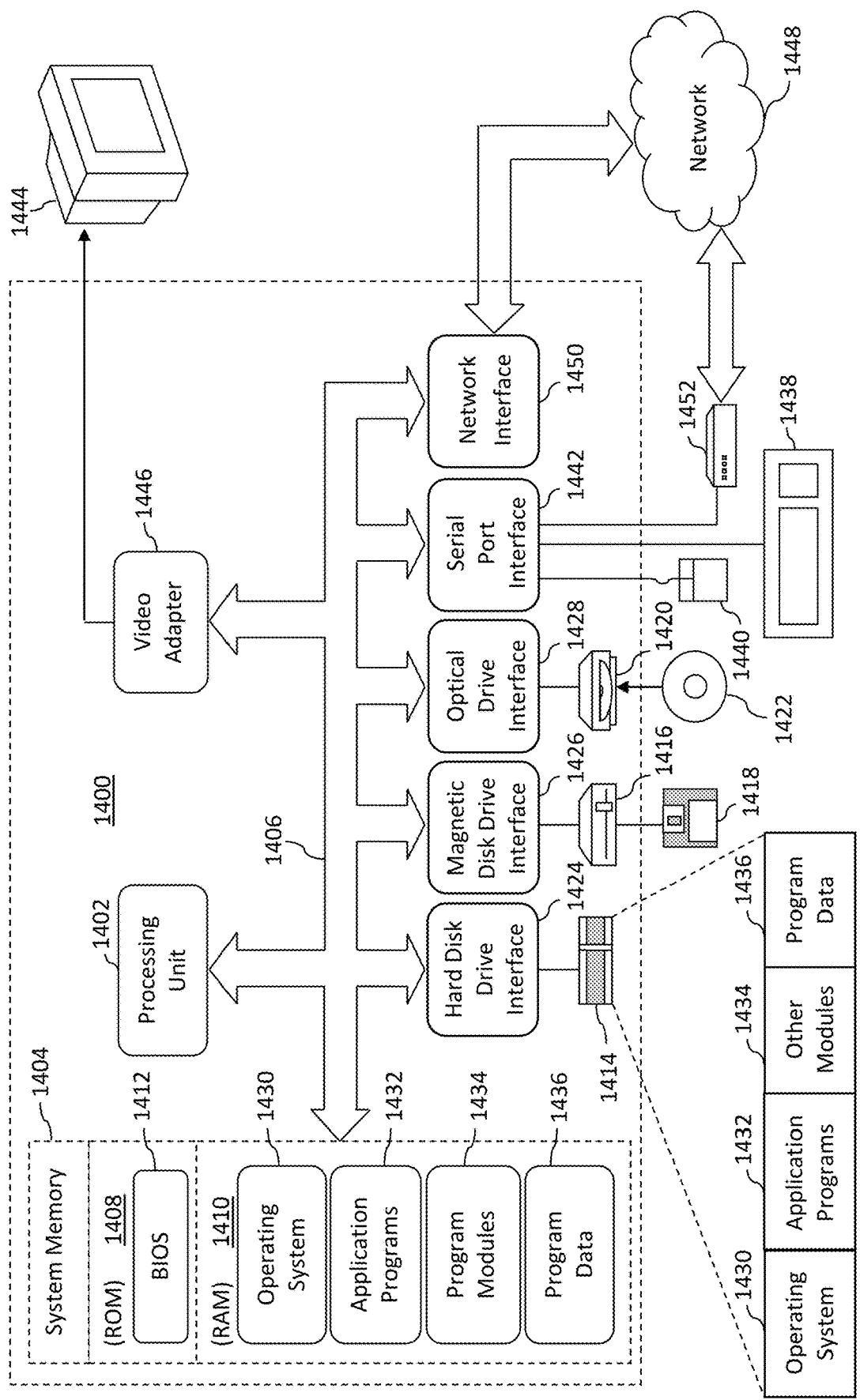

FIG. 14 depicts an example computer in which embodiments may be implemented.

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the relevant art(s) to implement such feature, structure, or characteristic in connection with other embodiments whether or not explicitly described.

II. Example Embodiments

Example embodiments described herein are capable of performing location-based book identification. For example, book(s) may be identified that discuss a location that is within a designated proximity to a mobile device. In accordance with this example, information regarding the book(s) may be provided for consumption by a user at the mobile device. For instance, the information may be displayed on the mobile device in response to the mobile device coming within the designated proximity to the location. The information may include an excerpt of at least one of the book(s), an indication of other location(s) that are discussed by at least one of the book(s), an offer to purchase at least one of the book(s), etc. The user may share the information through social media, interact with other readers and/or the author via a social network, etc. The information and/or data upon which the book(s) are identified may be crowd sourced.

Example techniques described herein have a variety of benefits as compared to conventional techniques for providing exposure to and/or selling books. For instance, the example techniques may be capable of providing unknown authors, well-known authors, authors who are supported by a publishing company, and authors who are not supported by a publishing company the same opportunities for exposing their books to the market and/or selling their books. Accordingly, the example techniques may level the playing field among the various authors with regard to having users discover and/or purchase their books.

The example techniques may engage users with content of the books for which information is provided to the users (e.g., because the users are relatively near the location or at the location that is discussed by the books). For instance, the users may "bump into" books they otherwise might not have discovered. Physically being at or near the location where a story takes place may provide an experience of engagement for the users that is not available in online or offline book stores and libraries.

The example techniques may provide the location-based book identification functionality via a mobile application (a.k.a. mobile app) that executes on the mobile device that is detected within the designated proximity to the location. For instance, the mobile app may utilize logic that is included in the mobile device and/or in a remote server to provide the functionality.

The example techniques may provide a platform through which users and authors may interact, authors may obtain analytics with regard to interactions of users with the locations that are discussed in their books, authors may promote their books, authors and/or users may create events and/or tours based on locations that are discussed in books, etc.

Figure 1:
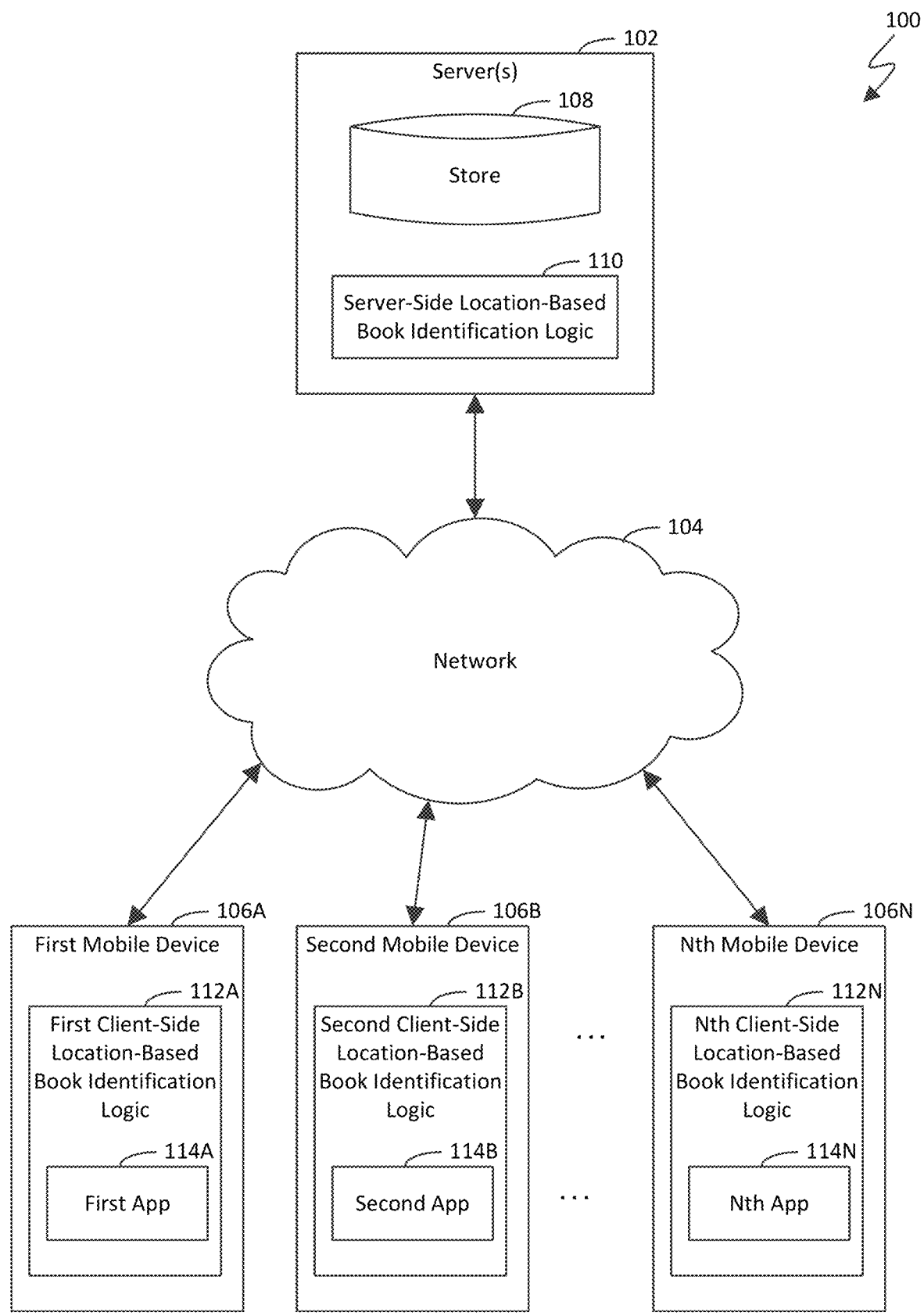
FIG. 1 is a block diagram of an example location-based book identification system in accordance with an embodiment.

FIG. 1 is a block diagram of an example location-based book identification system 100 (hereinafter "system 100") in accordance with an embodiment. Generally speaking, system 100 operates to provide information to users in response to requests (e.g., hypertext transfer protocol (HTTP) requests) that are received from the users. The information may include documents (e.g., Web pages, images, video files, etc.), output of executables, and/or any other suitable type of information. System 100 has location-based book identification functionality, which enables system 100 to perform location-based book identification in accordance with example embodiments described herein. Detail regarding techniques for performing location-based book identification is provided in the following discussion.

As shown in FIG. 1, system 100 includes server(s) 102, network 104, and a plurality of mobile devices 106A-106N. Communication among server(s) 102 and mobile devices 106A-106N is carried out over network 104 using well-known network communication protocols. Network 104 may be a wide-area network (e.g., the Internet), a local area network (LAN), another type of network, or a combination thereof.

Mobile devices 106A-106N are processing systems that are capable of communicating with server(s) 102. An example of a processing system is a system that includes at least one processor that is capable of manipulating data in accordance with a set of instructions. For instance, a processing system may be a computer, a personal digital assistant, etc. Mobile devices 106A-106N are configured to provide requests to server(s) 102 for requesting information stored on (or otherwise accessible via) server(s) 102. For instance, a user may initiate a request for executing a computer program (e.g., an application) using a client (e.g., a Web browser, Web crawler, or other type of client) deployed on a mobile device 106 that is owned by or otherwise accessible to the user. In accordance with some example embodiments, mobile devices 106A-106N are capable of accessing domains (e.g., Web sites) hosted by server(s) 102, so that mobile devices 106A-106N may access information that is available via the domains. Such domain may include Web pages, which may be provided as hypertext markup language (HTML) documents and objects (e.g., files) that are linked therein, for example.

It will be recognized that each of mobile devices 106A-106N may include any client-enabled mobile system or device, including but not limited to a laptop computer, a tablet computer, a wearable computer such as a smart watch or a head-mounted computer, a personal digital assistant, a cellular telephone, or the like.

Mobile devices 106A-106N are shown to include respective client-side location-based book identification logic 112A-112N (hereinafter "book identification logic 112A-112N"). Book identification logic 112A-112N are shown to include (e.g., execute) respective mobile apps 114A-114N. Each of the mobile devices 106A-106N, each of the book identification logic 112A-112N, and each of the mobile apps 114A-114N will now be referred to generally as mobile device 106, book identification logic 112, and mobile app 114, respectively, for ease of discussion.

Each book identification logic 112 is configured to perform respective client-side aspects of the location-based book identification functionality of system 100. Such client-side aspects of the location-based book identification functionality may include any one or more (e.g., all) operations of the location-based identification functionality of system 100. For example, the book identification logic 112 may detect that the mobile device 106 is within a designated proximity to a location. The book identification logic 112 may identify book(s) that discuss the location. The book identification logic 112 may provide information regarding at least one book via a user interface that is associated with the mobile device 106 based on the at least one book discussing the location. For instance, the book identification logic 112 may provide the information via a representation of the mobile app 114 that is displayed on the user interface.

In another example, book identification logic 112A-112N may determine whether the respective mobile devices 106A-106N are within a designated proximity to a location. Assume for purposes of illustration that first and second mobile devices 106A and 106B are within the designated proximity, and the other mobile devices are not. First and second book identification logic 112A and 112B may identify books that discuss the location. First book identification logic 112A may provide first information regarding a first subset of the books via a first user interface that is associated with first mobile device 106A based on each book in the first subset discussing the location and further based on each book in the first subset corresponding to a first attribute that is included in a first user profile of a first user of first mobile device 106A. For instance, first book identification logic 112A may provide the first information via a representation of mobile app 114A that is displayed on the first user interface. Second book identification logic 112B may provide second information regarding a second subset of the books via a second user interface that is associated with second mobile device 106B based on each book in the second subset discussing the location and further based on each book in the second subset corresponding to a second attribute that is included in a second user profile of a second user of second mobile device 106B. For instance, second book identification logic 112B may provide the second information via a representation of mobile app 114B that is displayed on the second user interface.

It will be recognized that any one or more (e.g., all) of the operations that are described above with respect to the foregoing examples may be performed by server-side location-based book identification logic 110 in combination with or in lieu of the respective client-side location-based book identification logic. Server-side location-based book identification logic 110 is described in further detail below in the discussion of server(s) 102.

Server(s) 102 are one or more processing systems that are capable of communicating with mobile devices 106A-106N. Server(s) 102 are configured to execute computer programs that provide information to users in response to receiving requests from the users. For example, the information may include documents (e.g., Web pages, images, video files, etc.), output of executables, or any other suitable type of information. In accordance with some example embodiments, server(s) 102 are configured to host one or more Web sites, so that the Web sites are accessible to users of system 100.

Server(s) 102 are shown to include a store 108 and server-side location-based book identification logic 110 (hereinafter "book identification logic 110"). Book identification logic 110 is configured to perform server-side aspects of the location-based book identification functionality of system 100. Such server-side aspects of the location-based book identification functionality may include any one or more (e.g., all) operations of the location-based identification functionality of system 100. For example, the book identification logic 110 may detect that a mobile device 106 is within a designated proximity to a location. The book identification logic 110 may identify book(s) that discuss the location. The book identification logic 110 may provide information regarding at least one book via a user interface that is associated with the mobile device 106 based on the at least one book discussing the location. For instance, the book identification logic 110 may provide the information via a representation of the mobile app 114 that is displayed on the user interface.

In another example, book identification logic 110 may determine whether mobile devices 106A-106N are within a designated proximity to a location. For example, book identification logic 110 may determine that first and second mobile devices 106A and 106B are within the designated proximity, and the other mobile devices are not. Book identification logic 110 may identify books that discuss the location. In accordance with this example, book identification logic 110 may provide first information regarding a first subset of the books via a first user interface that is associated with first mobile device 106A based on each book in the first subset discussing the location and further based on each book in the first subset corresponding to a first attribute that is included in a first user profile of a first user of first mobile device 106A. For instance, book identification logic 110 may provide the first information via a representation of mobile app 114A that is displayed on the first user interface. In further accordance with this example, book identification logic 110 may provide second information regarding a second subset of the books via a second user interface that is associated with second mobile device 106B based on each book in the second subset discussing the location and further based on each book in the second subset corresponding to a second attribute that is included in a second user profile of a second user of second mobile device 106B. For instance, book identification logic 110 may provide the second information via a representation of mobile app 114B that is displayed on the second user interface.

It will be recognized that any one or more (e.g., all) of the operations that are described above with respect to the foregoing examples may be performed by any one or more of client-side location-based book identification logic 112A-112N in combination with or in lieu of server-side location-based book identification logic 110.

Store 108 stores information that is to be downloaded among mobile devices 106A-106N and/or that is to be processed to determine other information to be downloaded among mobile devices 106A-106N. Such information may include but is not limited to full texts of books, excerpts from books, indications of locations that are discussed by books, mappings between locations and excerpts that discuss the locations, mappings between books and genres to which the books belong, information regarding offers to purchase books, profiles of users (a.k.a. user profiles), information regarding events and/or tours that are based on locations that are discussed by books, etc. Each excerpt from a book may include a designated number (e.g., 1, 2, 3, 4, etc.) of lines of text, sentences, paragraphs, or pages from the book. Store 108 may be any suitable type of store, including but not limited to a database (e.g., a relational database, an entity-relationship database, an object database, an object relational database, an XML database, etc.).

Each of book identification logic 110 and book identification logic 112A-112N may be implemented in various ways to perform location-based book identification, including being implemented in hardware, software, firmware, or any combination thereof. For example, each of book identification logic 110 and book identification logic 112A-112N may be implemented as computer program code configured to be executed in one or more processors. In another example, each of book identification logic 110 and book identification logic 112A-112N may be implemented as hardware logic/electrical circuitry. In an embodiment, each of book identification logic 110 and book identification logic 112A-112N may be implemented in a system-on-chip (SoC). Each SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Example techniques for performing location-based book identification are discussed in greater detail below with reference to FIGS. 2-13.

FIGS. 2-8 are block diagrams of mobile devices 200, 300, 400, 500, 600, 700, and 800, which are example implementations of one of mobile devices 106A-106N shown in FIG. 1, in accordance with embodiments. FIGS. 2-8 illustrate how the location-based book identification functionality of system 100 may be experienced by a user through the use of a mobile app (e.g., any of mobile apps 114A-114N).

Figure 2:
FIGS. 2-8 are block diagrams of example implementations of a device shown in FIG. 1 in accordance with embodiments.

As shown in FIG. 2, mobile device 200 includes a user interface 202 that is provided in the context of a mobile app, which executes on mobile device 200. User interface 202 enables the user to establish and/or change a profile of the user (i.e., the user's user profile), as indicated by heading 204. For instance, user interface 202 may be displayed to the user during a setup phase of the mobile app or upon selection by the user.

User interface 202 includes a picture 206, a name 208, and an email address 210 of the user. User interface 202 further includes categories 220 that are included in the user's profile. The categories 220 include "Notifications" 212, "Languages" 214, "Genres" 216, and "Books" 218. "Notifications" 212 represents types of notifications that are selectable by the user. The user may view which types of notifications are selected to be sent to the user by selecting virtual element 222. The user may select virtual element 222 by clicking on virtual element 222, performing a gesture (e.g., a touch gesture and/or hover gesture) with regard to virtual element 222, etc. For each type of notification that is selected, notifications of that type are sent to the user. For each type that is not selected, notifications of that type are not sent to the user. The user may also select the frequency with which each type of notifications or notifications in general are provided to the user.

"Languages" 214 represents languages (e.g., English, Spanish, French, etc.) that may be used when displaying text of books on mobile device 200 (e.g., via user interface 202). The user may view the language that is selected to be used for the text by selecting virtual element 224. Upon selection of virtual element 224, the user may change the language that is to be used when displaying the text. For instance, a menu that lists the various languages may be provided to the user upon selection of virtual element 224. For example, if the user reads in English, the user may select English from the list of languages; if the user reads in Spanish, the user may select Spanish, and so on. In accordance with this example, the book identification logic 110 and/or 112 may limit the books with regard to which information is to be provided to the user to only those books that are available in the selected language.

"Genres" 216 represents genres that may be associated with the user. The genres are selectable by the user. The user may view the genres that are associated with the user by selecting virtual element 226. For instance, selection of a genre may identify that genre as a "favorite" of the user. The genres that are associated with the user may be used by any of book identification logic 112A-112N and/or book identification logic 110 to select the information that is provided via user interface 202 in response to mobile device 200 being within a designated proximity to a location. For instance, the book identification logic 110 and/or 112 may filter books based on the genres that are associated with the user to provide a subset of the books. The book identification logic 110 and/or 112 may select the information to be provided via user interface 202 regarding (e.g., from) the subset of the books.

"Books" 218 represents books that may be associated with the user. The books are selectable by the user. The user may view the books that are associated with the user by selecting virtual element 228. For instance, selection of a book may identify that book as a "favorite" of the user. The books that are associated with the user may be used by any of book identification logic 112A-112N and/or book identification logic 110 to select the information that is provided via user interface 202 in response to mobile device 200 being within a designated proximity to a location. For example, the book identification logic 110 and/or 112 may assign a relatively greater weight to books that are associated with the user than to other books. In accordance with this example, the book identification logic 110 and/or 112 may select a subset of the books based on the weights of the books. For instance, each weight may correspond to a respective likelihood that the book to which the weight is assigned is selected to be included in the subset. The book identification logic 110 and/or 112 may select the information to be provided via user interface 202 regarding (e.g., from) the subset of the books. In another example, the book identification logic 110 and/or 112 may select the information to be provided via user interface 202 regarding only those books that are associated with the user.

User interface 202 further includes an "edit" virtual element 230, which is selectable by the user to enable the user to change the user's profile. For instance, selection of the "edit" virtual element 230 may enable the user to select and/or change the user's picture 206, name 208, and/or email address 210; which notifications are selected to be sent to the user; which language is selected to be used for the text in user interface 202; which genres are associated with the user; which books are associated with the user, etc.

User interface 202 further includes a "menu" virtual element 236, which the user may select to cause a menu to be provided in a user interface on mobile device 200. An example menu is described in detail below with reference to mobile device 800 shown in FIG. 8.

User interface 202 further includes a message window 232 to provide recommendations and/or instructions to the user. Message window 232 includes a message that states, "Accept Squirl notifications to discover books on the go," for illustrative purposes. User interface 202 further includes a virtual control 234 that enables the user to turn on and/or off notification functionality of the mobile app. If the notification functionality is turned on, notifications of the types that are selected to be sent to the user are sent to the user via the mobile app. If the notification functionality is turned off, no notifications are sent to the user via the mobile app.

Figure 3:
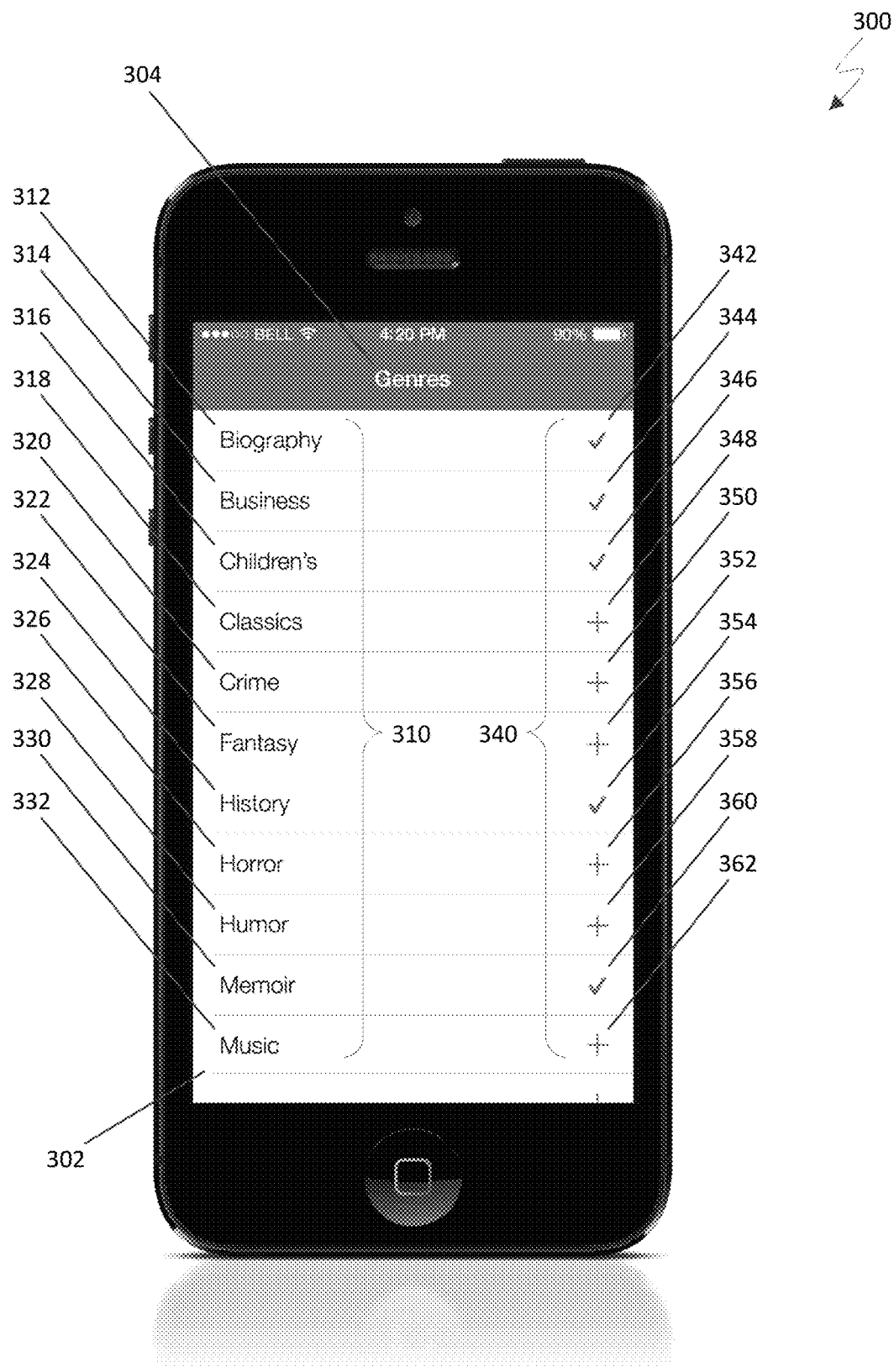

For purposes of illustration, assume that the user selects the "edit" virtual element 230. Further assume that the user selects the "Genres" category once the "edit" virtual element 230 is selected. FIG. 3 shows a user interface 302 that may be provided to enable the user to establish and/or change the genres that are associated with the user.

As shown in FIG. 3, mobile device 300 includes user interface 302 that is provided in the context of a mobile app, which executes on mobile device 300. User interface 302 lists genres 310 that may be associated with the user, as indicated by heading 304. For instance, user interface 202 may be displayed to the user during a setup phase of the mobile app or upon selection by the user.

The genres 310 include "Biography" 312, "Business" 314, "Children's" 316, "Classics" 318, "Crime" 320, "Fantasy" 322, "History" 324, "Horror" 326, "Humor" 328, "Memoir" 330, and "Music" 332. These genres are provided for illustrative purposes and are not intended to be limiting. It will be recognized that genres 310 may include any suitable genres. The user may select and/or change which genres are associated with the user by toggling the indicators 340 that correspond to the respective genres 310. As shown in FIG. 3, indicators 342, 344, 346, 354, and 360 are selected, indicating that genres 312, 314, 316, 324, and 330 are associated with the user. Indicators 348, 350, 352, 356, 358, and 362 are not selected, indicating that genres 318, 320, 322, 326, 328, and 332 are not associated with the user.

As an example, the user may select indicator 342 to cause indicator 342 to become deselected, thereby causing the "Biography" genre to not be associated with the user. In another example, the user may select indicator 362 to cause indicator 362 to become selected, thereby causing the "Music" genre to be associated with the user.

Figure 4:
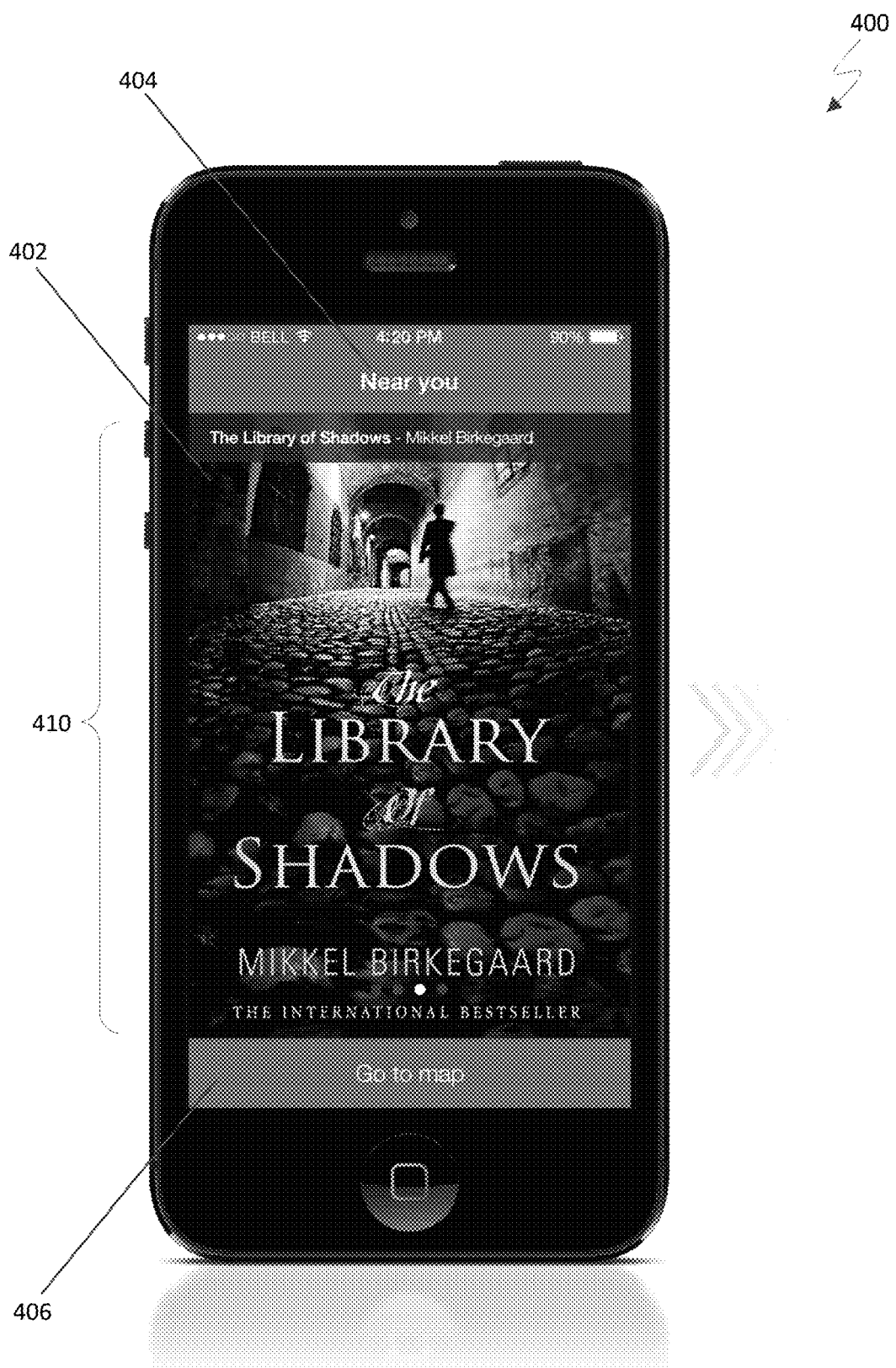

When the user is finished editing the user's profile, a start screen of the mobile app may be presented to the user. For instance, once the user's profile is established, the mobile app may open to the start screen each time the mobile app is opened and/or turned on. FIG. 4 shows a user interface 402 that depicts an example start screen of the mobile app.

As shown in FIG. 4, mobile device 400 includes user interface 402 that is provided in the context of a mobile app, which executes on mobile device 400. User interface 402 includes information 410 regarding a book titled "The Library of Shadows" by Mikkel Birkegaard based on the book discussing a location that is within a designated proximity of mobile device 400. The book "The Library of Shadows" may be sponsored featured content, though the scope of the example embodiments is not limited in this respect. Sponsored featured content is described in further detail below with reference to FIGS. 5 and 8. The information 410 includes a representation of the cover of the book, including the title of the book, the author of the book, an image that is portrayed on the cover, and a statement that the book is an international bestseller. This information 410 is mentioned for illustrative purposes and is not intended to be limiting. Any suitable information may be included in user interface 402.

In an example embodiment, the information 410 regarding the book is selectable by the user. In accordance with this embodiment, if the user selects the information 410, the book identification logic 110 and/or 112 shows a map that includes the locations that are discussed in the book. For instance, the locations may be represented by identifiers, such as virtual pins, stars, check marks, or other suitable type(s) of identifiers. The user may then explore more information about each location by selecting a representation of the location on the map.

User interface 404 further includes a heading 404, which reads "Near you," indicating that the book discusses a location near the user. A threshold may be established for determining whether a location is near the user. For instance, a location within a specified distance (e.g., 1, 2, 3, 4, 5, 10, etc. miles) from the user may be deemed "near the user". The book "The Library of Shadows" discusses Copenhagen, Denmark. Accordingly, in one example, any of book identification logic 112A-112N and/or book identification logic 110 may provide the information 410 via user interface 402 as a ship that is carrying the user pulls into the Port of Copenhagen in response to detecting that the user has come within the designated proximity to Copenhagen.

User interface 402 further includes a "Go to map" virtual element 406, which is selectable by the user to enable the user to view a map of an area in which the user is currently located. The map may include locations that are discussed in books and that are within the area. The user may select a location on the map to view information regarding book(s) that discuss the location. It will be recognized that each representation of a location on the map may correspond to a respective book. For instance, if multiple books discuss the same location (e.g., Copenhagen), the map may include multiple representations of the location that correspond to the respective books. A user may view information regarding one of the multiple books by selecting the representation of the location that corresponds to the book.

Figure 5:
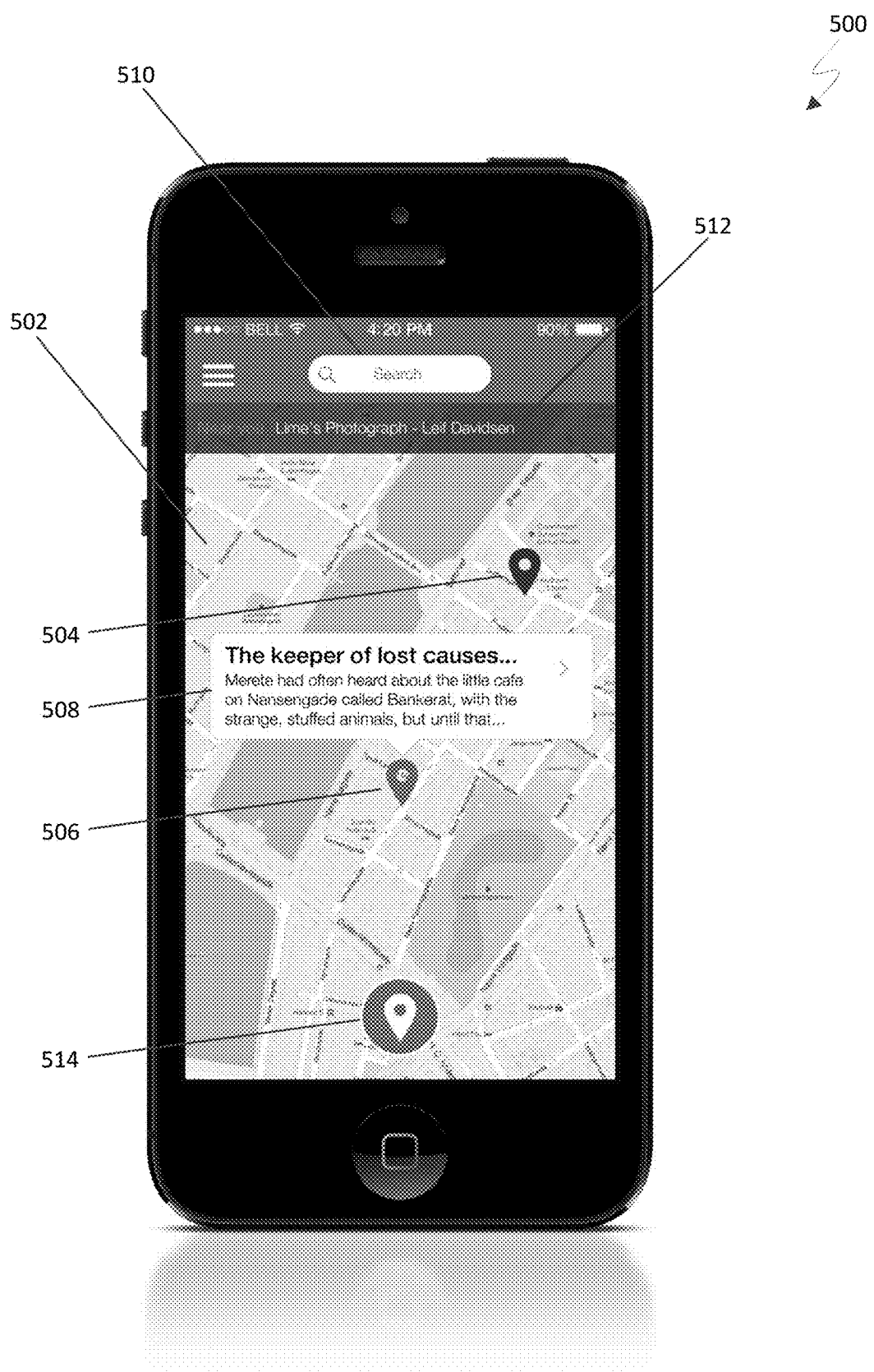

For purposes of illustration, assume that the user selects the "Go to map" virtual element 406. FIG. 5 shows a user interface 502 that may be provided to show the map that includes locations that are discussed in books and that are in the area in which the user is currently located.

As shown in FIG. 5, mobile device 500 includes user interface 502 that is provided in the context of a mobile app, which executes on mobile device 500. User interface 502 enables the user to view location(s) that are discussed in books and that are in the area in which the user is currently located, search for other locations, view information regarding displayed location(s), interact with displayed location(s), etc. For instance, user interface 502 shows locations 504 and 506, which are discussed in books and are within the area in which the user is currently located. As shown in FIG. 5, location 506 is discussed in a book titled "The Keeper of Lost Causes" by Jussi Adler-Olsen.

User interface 502 includes a message window 508, which provides information regarding the book that discusses location 506. For instance, the information in message window 508 is shown to include the title of the book and an excerpt from the book for illustrative purposes.

User interface 502 further includes a search window 510, which is configured to receive a search query upon which search results may be based. Mobile device 500 may be configured to retrieve the search results based on relative rankings of the respective search results. The rankings may be based on how closely the respective search results match terms in the search query. For example, the search query may specify a location, genre, author, title, etc. The search results may include books that correspond to the location, genre, author, title, etc. that is specified by the search query.

User interface 502 further includes another message window 512, which provides information regarding a sponsored featured book that discusses a location near the user. For example, message window 512 states, "Near you Lime's Photograph—Leaf Davidson," for illustrative purposes. Accordingly, the book "Lime's Photograph" by Leaf Davidson is a sponsored featured book that discusses a location that is near the user. The user may select the message window 512 to obtain more information about the sponsored featured book (e.g., to view an excerpt from and/or location(s) that are discussed by the sponsored featured book, etc.).

User interface 502 further includes a "location" virtual element 514, which is selectable by the user to enable the user to add a location to the map.

Figure 6:
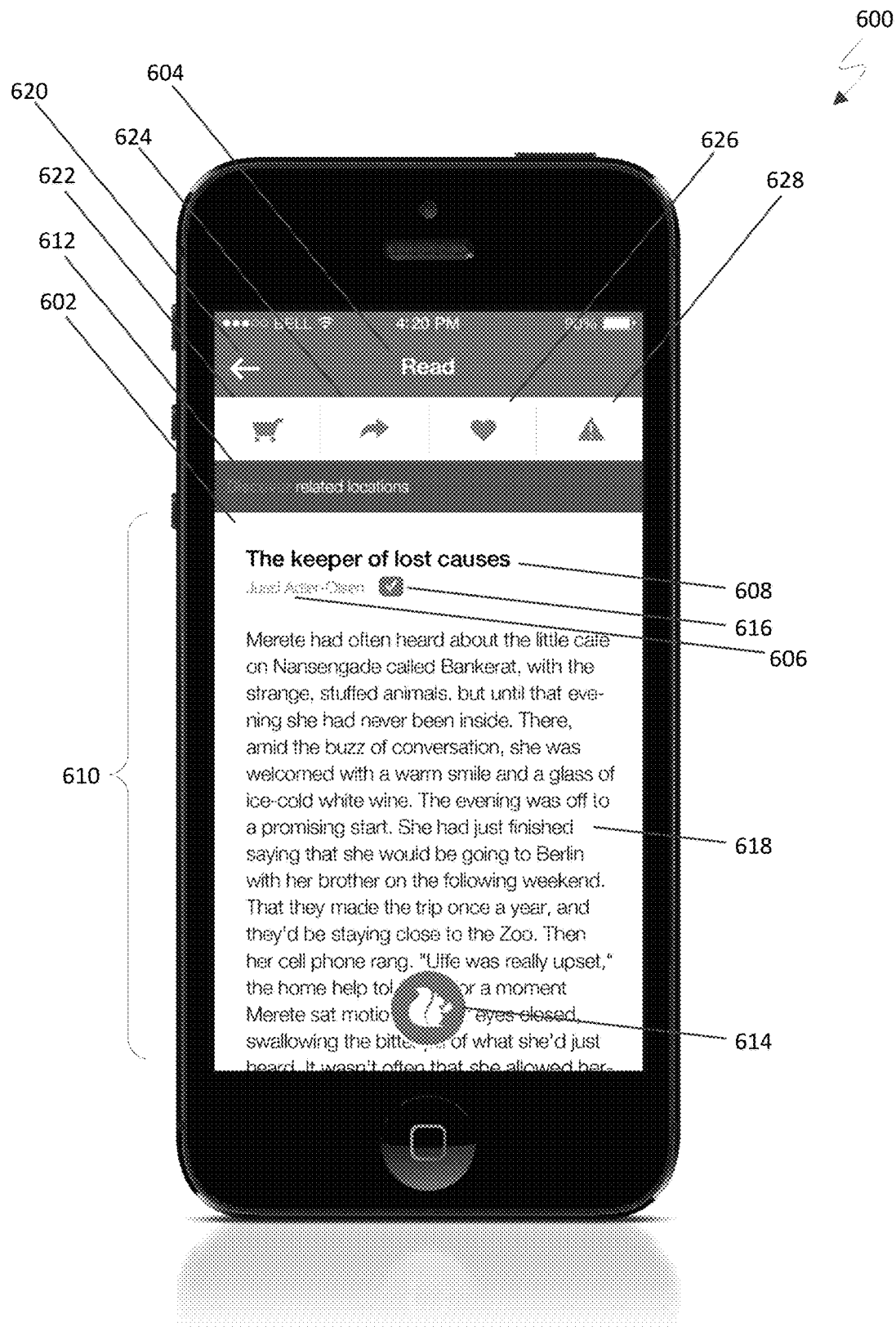

For purposes of illustration, assume that the user selects location 506 or the message window 508. FIG. 6 shows a user interface 602 that may be provided in response to the user selecting the location 506 or the message window 508.

As shown in FIG. 6, mobile device 600 includes user interface 602 that is provided in the context of a mobile app, which executes on mobile device 600. User interface 602 includes information 610 regarding the book that discusses location 506. For instance, the information 610 may include other information in addition to or in lieu of the information that is included in the message window 508. The information 610 is shown to include a title 608 of the book, an author 606 of the book, and a more extensive excerpt 618 than the excerpt included in the message window 508 in FIG. 5. User interface 602 includes a heading 604, which reads "Read," indicating that the user is to read the information 610. User interface 602 further includes a "claim" virtual element 616, which indicates whether the author of the book has claimed location 506. The "claim" virtual element 616 includes a check mark, indicating that the author has claimed location 506.

User interface 602 further includes a message window 612, which offers for the user to discover other locations that are related to location 506. For instance, the user may select the message window 612 to view a list of the related locations. The related locations may include locations that are discussed in books that are similar to the book that discussed location 506, locations that are discussed in books by authors that are similar to the author of the book that discusses location 506, locations that are discussed in other books written by the author of the book that discussed location 506, locations that are in a same geographic region as location 506, etc.

User interface 602 further includes icons 622, 624, 626, and 628. Icon 622 depicts a shopping cart, indicating that the user may select icon 622 to purchase the book that discusses location 506. Icon 624 depicts a right-pointing arrow, indicating that the user may select icon 624 to share the book with other users (e.g., in a social network). Icon 626 depicts a heart, indicating that the user may select icon 626 to add the book to the user's favorites. Icon 628 depicts a triangular caution sign, indicating that the user may select icon 628 to report the information 610 or the book to a manager of the mobile app. For instance, the user may report the information 610 or the book based on the information or the book violating a rule associated with the mobile app (e.g., profanity, inaccuracy, etc.). If the information or the book are deemed by the manager to violate the rule, the manager may remove the information, thereby make the information inaccessible in the context of the mobile app.

User interface 602 further includes a "back" virtual element 620, which the user may select to return to the map, which is shown in FIG. 5.

User interface 602 further includes a "Squirl" virtual element 614, which the user may select to view an information and comments page regarding the book. For instance, FIG. 7 shows a user interface 702 that may be provided in response to the user selecting the "Squirl" virtual element 614.

Figure 7:
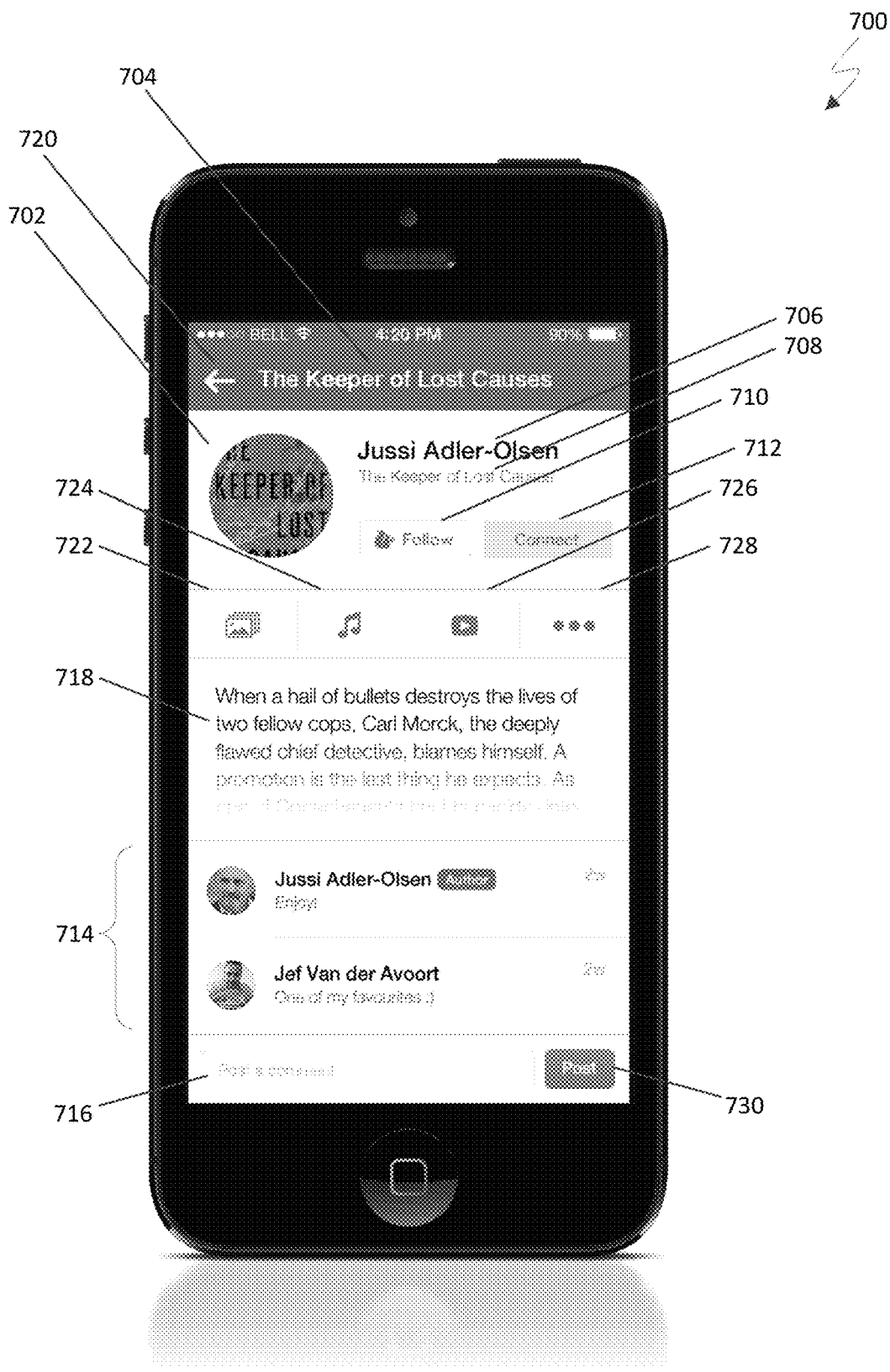

As shown in FIG. 7, mobile device 700 includes user interface 702 that is provided in the context of a mobile app, which executes on mobile device 700. User interface 702 includes information regarding the book that discusses location 506. For instance, user interface 702 includes the title 708 of the book, the author 706 of the book, and an excerpt 718 of the book. User interface 702 includes a heading 704, which includes the title of the book to indicate that the content shown in user interface 702 is directed to the book.

User interface 702 further includes comments 714 that may be posted by users and/or the author of the book. For instance, the comments 714 are shown to include a comment that reads "Enjoy!" from the author of the book and a comment that reads "One of my favorites :)" from the user of mobile device 700. User interface 702 further includes a text window 716, which is configured to receive comments from the user of mobile device 700, and a "Post" virtual element that is selectable by the user to cause a comment in the text window 716 to be posted (e.g., added to the comments 714).

Comments may be posted serially, as shown in FIG. 7, or in a nested manner. For example, the author may comment on a comment of the user, and the author's comment may be indented beneath the user's comment to indicate that the author's comment is in response to the user's comment. In another example, the user may comment on a comment of the author, and the user's comment may be indented beneath the author's comment to indicate that the user's comment is in response to the author's comment. A notification may be provided to the user via the mobile app in response to the author commenting on a comment of the user. For instance, the notification may indicate that the author has commented on the user's comment.

User interface 702 further includes icons 722, 724, 726, and 728. Icon 722 depicts still images, indicating that the user may select icon 722 to obtain images related to location 506. Icon 724 depicts a music note, indicating that the user may select icon 724 to obtain audio related to location 506. Icon 726 depicts a play button, indicating that the user may select icon 726 to obtain video related to location 506. Icon 728 depicts an ellipsis, indicating that the user may select icon 728 to obtain additional information related to location 506 or the book.

User interface further includes a "follow" virtual element 710 and a "connect" virtual element 712. The "follow" virtual element 710 is selectable by the user to cause the user to become a follower of the author of the book within the mobile app. As a follower of the author, the user may receive updates from the author, notifications of new books by the author, new locations that are discussed in books by the author, etc. The "connect" virtual element is selectable by the user to cause an invitation to be sent to the author, requesting that the user of mobile device 700 and the author become connected on a social network (e.g., Twitter®, Facebook®, etc.) that is external to the mobile app.

User interface 702 further includes a "back" virtual element 720. In one example, the user may select the "back" virtual element 720 to return to user interface 602, which is shown in FIG. 6. In another example, the user may select the "back" virtual element 720 to return to the map, which is shown in FIG. 5.

Figure 8:
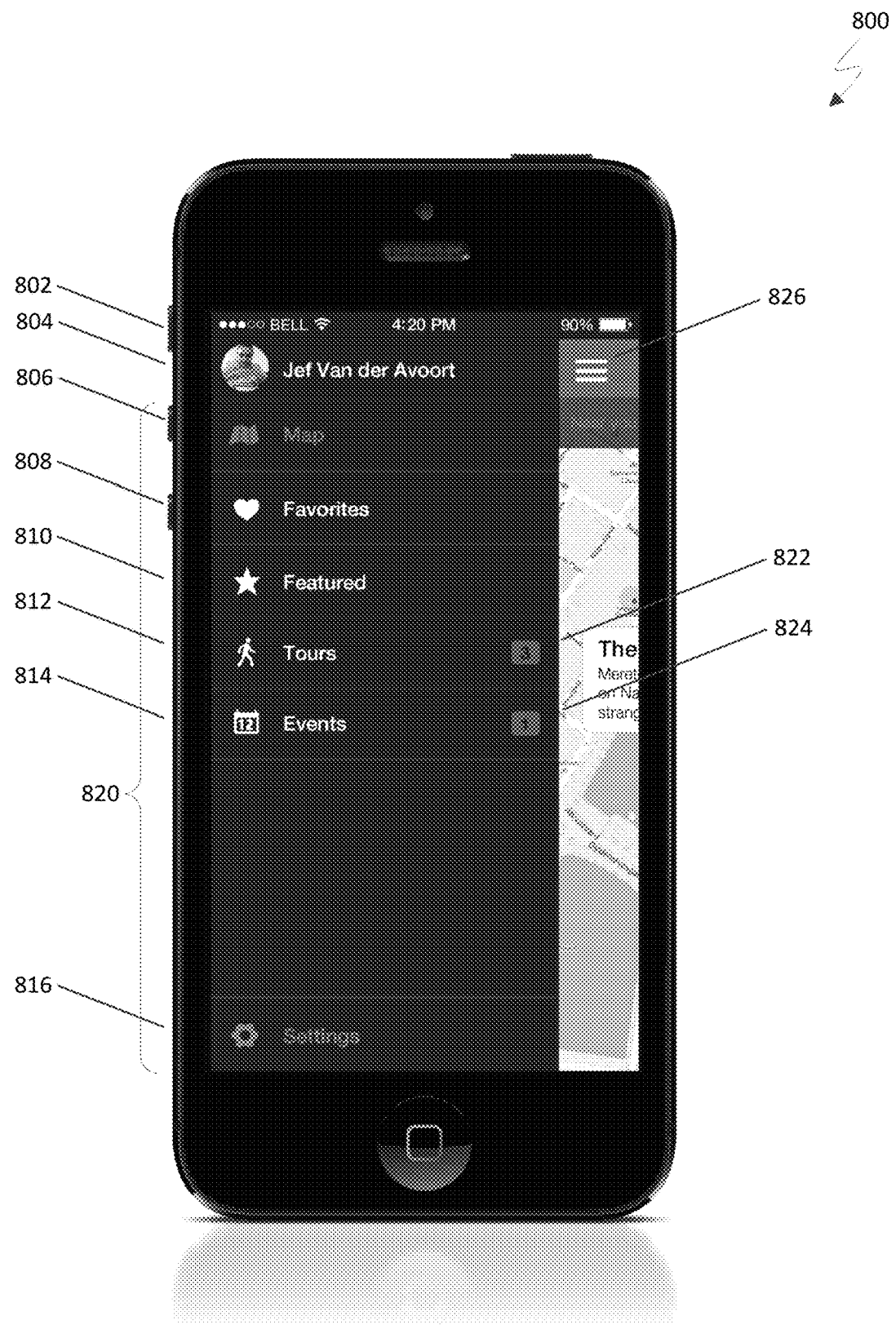

As shown in FIG. 8, mobile device 800 includes a user interface 802 that is provided in the context of a mobile app, which executes on mobile device 800. User interface 802 shows a menu 820 that is personalized to the user of mobile device 800, as indicated by user information 804. The user information 804 is shown to include an image of the user and a name of the user for illustrative purposes and is not intended to be limiting.

The menu 820 includes a map indicator 806, a favorites indicator 808, a featured indicator 810, a tours indicator 812, an events indicator 814, and a settings indicator 816. The map indicator 806 is selectable by the user to cause the map to be displayed via a user interface on device 800. The favorites indicator 808 is selectable by the user to cause a list of areas, locations, authors, books, etc. that are included in the favorites of the user to be displayed for the user. The featured indicator 810 is selectable by the user to cause one or more locations that are discussed in a sponsored book to be displayed for the user. The one or more locations may be selected based on the user's profile. The user may be allowed to specify a radius from the user's location, a radius surrounding a designated region, or otherwise control how the featured content is determined or displayed to the user. For instance, the user may follow a region so that featured content associated with the region is shown to the user. The tours indicator 812 is selectable by the user to enable the user to create and/or browse tours that are associated with locations discussed in books. The events indicator 814 is selectable by the user to enable the user to create and/or browse events that are associated with locations discussed in books.

The menu 820 further includes a tour counter 822 and an event counter 824. The tour counter 822 indicates a number of upcoming tours that the user of mobile device 700 has selected and/or created for participation by the user. For instance, the tour counter 822 indicates that the user has selected and/or created three upcoming tours in which to participate. The event counter 824 indicates a number of upcoming events that the user of mobile device 700 has selected and/or created for participation by the user. For instance, the event counter 824 indicates that the user has selected and/or created one upcoming event in which to participate.

Tours and events may be based on a user's favorite locations, themes, genres, etc. and/or locations that are discussed in books of designated author(s). Tours and events may be promoted by the user and/or by other(s). For example, the user may create a tour or event for free, and the tour or event may be made available to others for free. In accordance with this example, promoting the tour or event as featured content to other users may require the user to pay a fee. In further accordance with this example, the user may pay a subscription fee to have access to premium services of the mobile app. Accordingly, mobile device 800 may provide the premium services based on a determination that the user pays the subscription fee. For instance, mobile device 800 may provide a discount or a set number of promotions to the user periodically (e.g., monthly or yearly) in response to the determination that the user pays the subscription fee. Mobile device 800 may provide a slider control that enables the user to establish the manner in which each tour and event is promoted. For example, the slider control may correspond to a sliding scale having "local" at one end of the scale and "subject matter relevant" at the other end of the scale. In accordance with this example, the user may set the extent to which the audience for the promotion is to be local with respect to location(s) that are associated with the tour or event and the extent to which the profiles of the users in the audience match the subject matter of the tour or event.

Authors may pay a subscription fee to have access to premium services of the mobile app. For instance, an author may be allowed to see which users are in a designated proximity to locations in the author's book(s), see which users are selecting the locations, see comments from users regarding the locations, provide comments regarding the locations, report comments of users as violating a rule of the mobile app, etc. If the author pays the subscription fee, the author may be provided analytics regarding the locations that are discussed in the author's book(s). For instance, the analytics may be organized using a dashboard. The author may be allowed to provide promotions regarding the locations in response to paying the subscription fee.

User interface 802 further includes a "map" virtual element 826, which the user may select to return to the map, which is shown in FIG. 5. For instance, the map may slide back into user interface 802 in response to the user selecting the "map" virtual element 826.

The example mobile devices 200, 300, 400, 500, 600, 700, and 800 and corresponding user interfaces 202, 302, 402, 502, 602, 702, and 802 (and elements included therein) described above with reference to FIGS. 2-8 are provided for illustrative purposes and are not intended to be limiting. It will be recognized that any suitable user interface may be provided in the context of a mobile app to enable the user to experience the location-based book identification functionality of system 100 shown in FIG. 1.

FIG. 9 depicts a flowchart 900 of an example method for performing location-based book identification in accordance with an embodiment. Flowchart 900 may be performed by a system including any one or more of mobile devices 106A-106N and/or server(s) 102, for example. For illustrative purposes, flowchart 900 is described with respect to a system 1000 shown in FIG. 10. As shown in FIG. 10, system 1000 includes location-based book identification logic 1002 (hereinafter "book identification logic 1002") and display 1004. Location-based book identification logic 1002 includes detection logic 1006, identification logic 1008, provision logic 1010, determination logic 1012, and filter logic 1014. Display 1004 includes a user interface 1016. User interface 1016 includes virtual element(s) 1018. Further structural and operational embodiments will be apparent to persons skilled in the relevant art(s) based on the discussion regarding flowchart 900.

As shown in FIG. 9, the method of flowchart 900 begins at step 902. In step 902, it is detected that a mobile device is within a designated proximity to a location. In an example implementation, detection logic 1006 detects that the mobile device is within the designated proximity to the location.

At step 904, book(s) that discuss the location are identified. For example, the book(s) may be associated with the location by any one or more users of the mobile app, the author(s) of the book(s), etc. Accordingly, the book(s) may be identified based on crowd sourced data specifying that the book(s) discuss the location. Crowd sourced data is data that is obtained (e.g., aggregated) from a group of people (e.g., from an online community). For instance, each person in the group may contribute a portion (i.e., less than all) of the crowd sourced data. In another example, the book(s) may be identified in response to (e.g., based on) detecting that the mobile device is within the designated proximity. In an example implementation, identification logic 1008 identifies the book(s).

At step 906, information regarding at least one book is provided via a user interface that is associated with the mobile device based on the at least one book discussing the location. It should be noted that the at least one book is included among the book(s) that are identified at step 904 as discussing the location. The information may pertain to the location, though the example embodiments are not limited in this respect. The user interface may be incorporated in the mobile device or included in another device that is electrically coupled to the mobile device via a wireless or wired connection, for example. In one example, the information may be provided based on a setting in the at least one book being in the location. For instance, the setting may be a setting of a scene in the book or a setting of the overall storyline in the book. In another example, the information may be provided further based on detecting that the mobile device is within the designated proximity.

In an example embodiment, step 906 includes providing crowd sourced information regarding the at least one book. In another example embodiment, step 906 includes providing an excerpt from each of the at least one book. In accordance with this embodiment, each excerpt may discuss the location. In yet another example embodiment, step 906 includes, for one or more of the at least one book, providing an indication of additional location(s) that are discussed by the respective book. In accordance with this embodiment, the additional location(s) may be derived from crowd sourced information regarding the at least one book.

In an example implementation, user interface 1016 is displayed on display 1004 (e.g., a screen). In accordance with this implementation, provision logic 1010 provides the information via user interface 1016. It will be recognized that user interface 1016 need not necessarily be displayed on display 1004. For instance, in another example implementation, user interface 1016 includes a speaker. In accordance with this implementation, provision logic 1010 provides the information via the speaker. In yet another example implementation, provision logic 1010 provides the information via display 1004 and a speaker.

In some example embodiments, one or more steps 902, 904, and/or 906 of flowchart 900 may not be performed. Moreover, steps in addition to or in lieu of steps 902, 904, and/or 906 may be performed. For instance, in first example embodiment, the method of flowchart 900 includes causing a virtual element to be displayed via (e.g., on) the user interface in response to providing the information. Examples of a virtual element include but are not limited to a virtual button, an icon, a widget, a hyperlink, a text window, an image, etc. In accordance with this embodiment, the virtual element enables a user of the mobile device to buy the at least one book. For instance, the virtual element may be icon 622 shown in FIG. 6.

In a second example embodiment, the method of flowchart 900 includes causing a virtual element to be displayed via the user interface in response to providing the information. In accordance with this embodiment, the virtual element enables a user of the mobile device to share the information with at least one other person. In one example, the at least one other person may be included in a social network of the user. In another example, the virtual element may be icon 624 shown in FIG. 6.

In a third example embodiment, the method of flowchart 900 includes causing a virtual element to be displayed via the user interface in response to providing the information. In accordance with this embodiment, the virtual element enables a user of the mobile device to add an indicator that is associated with the information to a list of favorite content of the user. In one example, the list may include one or more indicators corresponding to one or more respective instances of information. In another example, the virtual element may be icon 626 shown in FIG. 6.

In a fourth example embodiment, the method of flowchart 900 includes causing a virtual element to be displayed via the user interface in response to providing the information. In accordance with this embodiment, the virtual element enables a user of the mobile device to identify the information as violating a rule associated with a mobile application that is executing on at least one processor of the mobile device. In one example, the information may violate a rule by including profanity, an inaccuracy, etc. In another example, the virtual element may be icon 628 shown in FIG. 6.

In a fifth example embodiment, the method of flowchart 900 includes causing a virtual element to be displayed via the user interface in response to providing the information. In accordance with this embodiment, the virtual element enables a user of the mobile device to follow an author of the at least one book in a social network. In one example, the social network may be associated with a mobile app that executes on the mobile device. For instance, the user of the mobile device may experience location-based book identification functionality in accordance with the techniques described herein through the mobile app. In another example, the virtual element may be the "follow" virtual element 710 shown in FIG. 7.

In accordance with the first, second, third, fourth, and fifth example embodiments mentioned above, provision logic 1010 may cause one or more of the virtual elements to be displayed via user interface 1016. For instance, display 1004 may display each virtual element via user interface 1016 in response to a respective signal that is received from provision logic 1010.

In another example embodiment, the method of flowchart 900 includes determining that a selectable virtual element that is displayed on the user interface is selected by a user of the mobile device. For example, determination logic 1012 may determine that the selectable virtual element is selected by the user. In another example, the selectable virtual element may be the "location" virtual element 514 shown in FIG. 5. In accordance with this embodiment, the method of flowchart 900 further includes providing a second interface element that enables the user to select one or more other locations that are discussed in the at least one book or in at least one other book based on the selectable virtual element being selected by the user. For instance, provision logic 1010 may provide the second interface element.

In an aspect of this embodiment, the method of flowchart 900 may further include determining that a second location that is included in the one or more other locations is selected by the user via the second interface element. For instance, determination logic 1012 may determine that the second location is selected by the user. In accordance with this aspect, the method of flowchart 900 may further include providing a message to the user in response to determining that the second location is selected by the user via the second interface element. The message may be any suitable type of message, including but not limited to an email, a short message service (SMS) message, an instant message (IM), etc. The message may include a reference (e.g., link) to a website that enables the user to provide information regarding the second location. For instance, provision logic 1010 may provide the message to the user. The reference may include a universal resource identifier (URI) that is associated with (e.g., that identifies) the website. For instance, the URI may include a universal resource locator (URL), a universal resource name (URN), etc. that is associated with the website. The information regarding the second location may be selectable by at least one user of at least one other mobile device based on the at least one other mobile device being within a second designated proximity of the second location. The second designated proximity and the first designated proximity may be the same or different. In further accordance with this aspect, the method of flowchart 900 may further include associating the second location with a pin on a map that is accessible via a mobile app that executes on the mobile device. For instance, identification logic 1008 may associate the second location with the pin on the map.

In another aspect of this embodiment, the method of flowchart 900 may further include determining that a second location that is included in the one or more other locations is selected by the user via the second interface element. For instance, determination logic 1012 may determine that the second location is selected by the user. In accordance with this aspect, the method of flowchart 900 may further include providing a third interface element that enables the user to provide information regarding the second location in response to determining that the second location is selected by the user via the second interface element. For instance, provision logic 1010 may provide the third interface element. In further accordance with this aspect, the method of flowchart 900 may further include providing a message to the user in response to receiving the information regarding the second location via the third interface. The message may include a reference to a website that enables the user to provide information regarding a book that discussed the second location to associate the information with the second location. For instance, provision logic 1010 may provide the message.

In yet another example embodiment, the method of flowchart 900 includes providing audiovisual content regarding the location via the user interface in response to detecting that the mobile device is within the designated proximity to the location. Audiovisual content includes audio content, visual content, or a combination thereof. Visual content is content that has a visual component. Examples of visual content include but are not limited to a photograph, a graphical image, and a video (e.g., an animation). Audio content is content that has audio component. Examples of audio content include but are not limited to an audio clip and a video. The audiovisual content may be provided in response to a determination that the user selects a virtual element on the user interface. In one example, provision logic 1010 may provide the audiovisual content via user interface 1016.

In still another example embodiment, the method of flowchart 900 includes filtering the book(s) based on a designated theme to determine that the at least one book corresponds to the designated theme and that others of the book(s) do not correspond to the designated theme. For instance, filter logic 1014 may filter the book(s). Examples of a theme include education, horror, etc. For an education theme, the book(s) may be filtered such that the each of the at least one book includes each of the book(s) that is identified as being educational. In accordance with this embodiment, step 906 may be performed in response to (e.g., subsequent to) filtering the book(s).

It will be recognized that system 1000 may not include one or more of book identification logic 1002, display 1004, detection logic 1006, identification logic 1008, provision logic 1010, determination logic 1012, filter logic 1014, user interface 1016, and/or virtual element(s) 1018. Furthermore, system 1000 may include logic in addition to or in lieu of book identification logic 1002, display 1004, detection logic 1006, identification logic 1008, provision logic 1010, determination logic 1012, filter logic 1014, user interface 1016, and/or virtual element(s) 1018.

FIG. 11 depicts a flowchart 1100 of another example method for performing location-based book identification in accordance with an embodiment. Flowchart 1100 may be performed by a system including any one or more of mobile devices 106A-106N and/or server(s) 102, for example. For illustrative purposes, flowchart 1100 is described with respect to a system 1200 shown in FIG. 12. As shown in FIG. 12, system 1200 includes location-based book identification logic 1202 (hereinafter "book identification logic 1202"). Book identification logic 1202 includes detection logic 1204, identification logic 1206, provision logic 1208, and determination logic 1210. Further structural and operational embodiments will be apparent to persons skilled in the relevant art(s) based on the discussion regarding flowchart 1100.

As shown in FIG. 11, the method of flowchart 1100 begins at step 1102. In step 1102, it is detected that mobile devices are within a designated proximity to a location. In an example implementation, detection logic 1204 detects that the mobile devices are within the designated proximity to the location.

At step 1104, books that discuss the location are identified. In an example implementation, identification logic 1206 identifies the books that discuss the location.

At step 1106, first information regarding a first subset of the books is provided via a first user interface that is associated with a first mobile device based on each book in the first subset discussing the location and further based on each book in the first subset corresponding to a first attribute that is included in a first user profile of a first user of the first mobile device. The mobile devices that are within the designated proximity to the location include the first mobile device. In an example implementation, provision logic 1208 provides the first information via the first user interface.

At step 1108, second information regarding a second subset of the books is provided via a second user interface that is associated with a second mobile device based on each book in the second subset discussing the location and further based on each book in the second subset corresponding to a second attribute that is included in a second user profile of a second user of the second mobile device. The mobile devices that are within the designated proximity to the location include the second mobile device. In an example implementation, provision logic 1208 provides the second information via the second user interface.

In some example embodiments, one or more steps 1102, 1104, 1106, and/or 1108 of flowchart 1100 may not be performed. Moreover, steps in addition to or in lieu of steps 1102, 1104, 1106, and/or 1108 may be performed. For instance, in an example embodiment, the method of flowchart 1100 includes determining that one or more mobile devices, which are included in the mobile devices that are within the designated proximity to the location, are within a second proximity to the location. The second proximity and the designated proximity may be the same or different. For instance, determination logic 1210 may determine that the one or more mobile devices are within the second proximity to the location. In accordance with this embodiment, the method of flowchart 1100 includes presenting an offer to tour a geographical area that includes the location via one or more user interfaces associated with the one or more respective mobile devices based on a determination that the one or more mobile devices are within the second proximity to the location. For instance, provision logic 1208 may present the offer.

For example, the offer may be presented further based on a number of the one or more mobile devices reaching (e.g., equaling or exceeding) a specified (e.g., predetermined) threshold. In one scenario, the offer may be presented automatically in response to the determination that the one or more mobile devices are within the second proximity to the location and/or the number of the one or more mobile devices reaching the specified threshold. In another scenario, the offer may be presented in response to an instruction that is received from a user of a mobile device, an author of a book that discusses the location.

A tour may include a plurality of locations. Provision logic 1208 may enable a user to control how far away the locations in the tour are from each other. Provision logic 1208 may enable the user to select one or more of the locations that are to be included in a tour based on a designated genre, book, author, etc. Determination logic 1210 may determine one or more of the locations that are to be included in a tour based on information that is included in a profile of the user.

In an aspect of this embodiment, the method of flowchart 1100 may further include receiving an acceptance of the offer from a subset of the one or more mobile devices. For instance, provision logic 1208 may receive the acceptance. In accordance with this aspect, the method of flowchart 100 may further include providing the tour to a subset of users corresponding to the subset of the one or more mobile devices. For instance, provision logic 1208 may provide the tour. In further accordance with this aspect, providing the tour includes providing directions for navigating through the geographical area in real-time to each user in the subset of users via a respective user interface of the one or more user interfaces.

In another aspect of this embodiment, the method of flowchart 1100 may further include determining that each user in a subset of users corresponding to the one or more mobile devices has a profile that includes an attribute (e.g., a familiar, liked, or favorite location) corresponding to an attribute (e.g., a theme) of the tour. For instance, determination logic 1210 may determine that each user in the subset has a profile that includes an attribute corresponding to an attribute of the tour. In accordance with this aspect, presenting the offer includes presenting the offer to tour the geographical area via the one or more user interfaces associated with the one or more respective mobile devices further based on a determination that each user in the subset of users has a profile that includes an attribute corresponding to an attribute of the tour.

In another example embodiment, the method of flowchart 1100 includes causing virtual elements to be displayed on user interfaces that are associated with the respective mobile devices. Each virtual element enables a user of the respective mobile device to schedule an event at the location. For instance, provision logic 1208 may cause the virtual elements to be displayed.

In yet another example embodiment, the method of flowchart 1100 includes causing virtual elements to be displayed on user interfaces that are associated with the respective mobile devices. Each virtual element enables a user of the respective mobile device to review a list of events that are scheduled to occur at the location. For instance, provision logic 1208 may cause the virtual elements to be displayed.

In still another example embodiment, the method of flowchart 1100 includes providing analytics to an author of a book that discusses the location. The analytics specify (a) locations that are associated with the book, (b) persons who have provided at least one comment regarding at least one of the locations, and/or (c) demographic information regarding the persons who have provided at least one comment regarding at least one of the locations. For instance, provision logic 1208 may provide the analytics.

In yet another example embodiment, the method of flowchart 1100 includes receiving payment from an author to include specified information regarding a specified book that is written by the author in information that is to be provided to mobile devices when the mobile devices come within the designated proximity to the location. For instance, provision logic 1208 may receive the payment from the author. In accordance with this embodiment, the first information and the second information include the specified information based on receipt of the payment from the author. For instance, provision logic 1208 may include the specified information in the first information and the second information based on receipt of the payment from the author. In one aspect, the specified information may be included in the first information and the second information based on the author paying more than other authors for the author's book to be promoted with regard to the location.

In still another example embodiment, the method of flowchart 1100 includes one or more of the steps shown in flowchart 1300 of FIG. 13. As shown in FIG. 13, the method of flowchart 1300 begins at step 1302. In step 1302, payment is received from an author to promote a specified book that is written by the author, the specified book not discussing the location but discussing a second location. In an example implementation, provision logic 1208 receives the payment.

At step 1304, an indication that specifies an outer boundary of a geographical region corresponding to the location is received from a third user of a third mobile device. The outer boundary may be defined by a designated radius from the location or by a boundary of a governmental municipality (e.g., city, county, state, etc.). In an example implementation, provision logic 1208 receives the indication.

At step 1306, information regarding the specified book is provided via a third user interface that is associated with the third mobile device based on receipt of the payment from the author and further based on the second location being within the outer boundary. In an example implementation, provision logic 1208 provides the information regarding the specified book. In one aspect, the information regarding the specified book may be provided based on the author paying more than other authors for the specified book to be promoted with regard to the location.

It will be recognized that system 1200 may not include one or more of book identification logic 1202, detection logic 1204, identification logic 1206, provision logic 1208, and/or determination logic 1210. Furthermore, system 1200 may include logic in addition to or in lieu of book identification logic 1202, detection logic 1204, identification logic 1206, provision logic 1208, and/or determination logic 1210.

Although the operations of some of the disclosed methods are described in a particular, sequential order for convenient presentation, it should be understood that this manner of description encompasses rearrangement, unless a particular ordering is required by specific language set forth herein. For example, operations described sequentially may in some cases be rearranged or performed concurrently. Moreover, for the sake of simplicity, the attached figures may not show the various ways in which the disclosed methods can be used in conjunction with other methods.

Any of the techniques described herein may be performed through a mobile app that executes on a mobile device. For instance, the book identification logic (e.g., any one or more of book identification logic 110, 112A-112N, 1002, and/or 1202) described herein may perform operations in the context of the mobile application. In some example embodiments, the mobile app is integrated (e.g., fully integrated) with one or more other applications and/or e-readers.

The techniques described herein may include scanning a page of a book (e.g., to determine location(s) discussed therein); scanning a QR code that is printed on a book (e.g., to determine an identity of the book); attaching photos, video, sound, or music (e.g., from external services such as YouTube®, Instagram®, iTunes®, Spotify®, etc.) to locations that are described in a book; providing an e-book store that is integrated with the mobile app (e.g., with publishing and promotion tools for authors); providing a curated version of the mobile app for students (e.g., with content that is based on educational theme(s)); providing a television show or a Web show that takes viewers on a trip around a designated region (e.g., city, county, state, country, or the world), visiting locations that are discussed in books; enabling users to access such a television show or Web show by selecting a location that is visited in the show; integrating the mobile app with augmented reality device(s) (e.g., Google Glass®) to provide integrated directions and/or media with regard to locations that are discussed in books (e.g., to provide automated tours with regard to the locations); offering trips and/or tours to locations that are discussed in books that are associated with the mobile app; providing a dashboard to each author that shows the author the locations that are discussed in the author's books, enables the author to claim the locations and/or create new locations and claim the new locations, who has commented on the locations, demographics of the users who have provided comments, and so on.

Any one or more of book identification logic 112A-112N, book identification logic 110, book identification logic 1002, detection logic 1006, identification logic 1008, provision logic 1010, determination logic 1012, filter logic 1014, user interface 1016, book identification logic 1202, detection logic 1204, identification logic 1206, provision logic 1208, and/or determination logic 1210, flowchart 900, flowchart 1100, and/or flowchart 1300 may be implemented in hardware, software, firmware, or any combination thereof.

For example, any one or more of book identification logic 112A-112N, book identification logic 110, book identification logic 1002, detection logic 1006, identification logic 1008, provision logic 1010, determination logic 1012, filter logic 1014, user interface 1016, book identification logic 1202, detection logic 1204, identification logic 1206, provision logic 1208, and/or determination logic 1210, flowchart 900, flowchart 1100, and/or flowchart 1300 may be implemented as computer program code configured to be executed in one or more processors.

In another example, any one or more of book identification logic 112A-112N, book identification logic 110, book identification logic 1002, detection logic 1006, identification logic 1008, provision logic 1010, determination logic 1012, filter logic 1014, user interface 1016, book identification logic 1202, detection logic 1204, identification logic 1206, provision logic 1208, and/or determination logic 1210, flowchart 900, flowchart 1100, and/or flowchart 1300 may be implemented as hardware logic/electrical circuitry.

For instance, in an embodiment, one or more of book identification logic 112A-112N, book identification logic 110, book identification logic 1002, detection logic 1006, identification logic 1008, provision logic 1010, determination logic 1012, filter logic 1014, user interface 1016, book identification logic 1202, detection logic 1204, identification logic 1206, provision logic 1208, and/or determination logic 1210, flowchart 900, flowchart 1100, and/or flowchart 1300 may be implemented in a system-on-chip (SoC). The SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

III. Example Computer System

FIG. 14 depicts an example computer 1400 in which embodiments may be implemented. For instance, any of mobile devices 106A-106N and/or server(s) 102 shown in FIG. 1 may be implemented using computer 1400, including one or more features of computer 1400 and/or alternative features. Computer 1400 may be a general-purpose computing device in the form of a conventional personal computer, a mobile computer, or a workstation, for example, or computer 1400 may be a special purpose computing device. The description of computer 1400 provided herein is provided for purposes of illustration, and is not intended to be limiting. Embodiments may be implemented in further types of computer systems, as would be known to persons skilled in the relevant art(s).

As shown in FIG. 14, computer 1400 includes a processing unit 1402, a system memory 1404, and a bus 1406 that couples various system components including system memory 1404 to processing unit 1402. Bus 1406 represents one or more of any of several types of bus structures, including a memory bus or memory controller, a peripheral bus, an accelerated graphics port, and a processor or local bus using any of a variety of bus architectures. System memory 1404 includes read only memory (ROM) 1408 and random access memory (RAM) 1410. A basic input/output system 1412 (BIOS) is stored in ROM 1408.

Computer 1400 also has one or more of the following drives: a hard disk drive 1414 for reading from and writing to a hard disk, a magnetic disk drive 1416 for reading from or writing to a removable magnetic disk 1418, and an optical disk drive 1420 for reading from or writing to a removable optical disk 1422 such as a CD ROM, DVD ROM, or other optical media. Hard disk drive 1414, magnetic disk drive 1416, and optical disk drive 1420 are connected to bus 1406 by a hard disk drive interface 1424, a magnetic disk drive interface 1426, and an optical drive interface 1428, respectively. The drives and their associated computer-readable storage media provide nonvolatile storage of computer-readable instructions, data structures, program modules and other data for the computer. Although a hard disk, a removable magnetic disk and a removable optical disk are described, other types of computer-readable storage media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 1430, one or more application programs 1432, other program modules 1434, and program data 1436. Application programs 1432 or program modules 1434 may include, for example, computer program logic for implementing any one or more of book identification logic 112A-112N, book identification logic 110, book identification logic 1002, detection logic 1006, identification logic 1008, provision logic 1010, determination logic 1012, filter logic 1014, user interface 1016, book identification logic 1202, detection logic 1204, identification logic 1206, provision logic 1208, and/or determination logic 1210, flowchart 900 (including any step of flowchart 900), flowchart 1100 (including any step of flowchart 1100), and/or flowchart 1300 (including any step of flowchart 1300), as described herein.

A user may enter commands and information into the computer 1400 through input devices such as keyboard 1438 and pointing device 1440. Other input devices (not shown) may include a microphone, joystick, game pad, satellite dish, scanner, touch screen, camera, accelerometer, gyroscope, or the like. These and other input devices are often connected to the processing unit 1402 through a serial port interface 1442 that is coupled to bus 1406, but may be connected by other interfaces, such as a parallel port, game port, or a universal serial bus (USB).

A display device 1444 (e.g., a monitor) is also connected to bus 1406 via an interface, such as a video adapter 1446. In addition to display device 1444, computer 1400 may include other peripheral output devices (not shown) such as speakers and printers.

Computer 1400 is connected to a network 1448 (e.g., the Internet) through a network interface or adapter 1450, a modem 1452, or other means for establishing communications over the network. Modem 1452, which may be internal or external, is connected to bus 1406 via serial port interface 1442.

As used herein, the terms "computer program medium" and "computer-readable storage medium" are used to generally refer to media such as the hard disk associated with hard disk drive 1414, removable magnetic disk 1418, removable optical disk 1422, as well as other media such as flash memory cards, digital video disks, random access memories (RAMs), read only memories (ROM), and the like. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Example embodiments are also directed to such communication media.

As noted above, computer programs and modules (including application programs 1432 and other program modules 1434) may be stored on the hard disk, magnetic disk, optical disk, ROM, or RAM. Such computer programs may also be received via network interface 1450 or serial port interface 1442. Such computer programs, when executed or loaded by an application, enable computer 1400 to implement features of embodiments discussed herein. Accordingly, such computer programs represent controllers of the computer 1400.

Example embodiments are also directed to computer program products comprising software (e.g., computer-readable instructions) stored on any computer-useable medium. Such software, when executed in one or more data processing devices, causes a data processing device(s) to operate as described herein. Embodiments may employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMS-based storage devices, nanotechnology-based storage devices, and the like.

It will be recognized that the disclosed technology is not limited to any particular computer or type of hardware. Certain details of suitable computers and hardware are well known and need not be set forth in detail in this disclosure.

IV. Conclusion

While various embodiments have been described above, it should be understood that they have been presented by way of example only, and not limitation. It will be apparent to persons skilled in the relevant art(s) that various changes in form and details can be made therein without departing from the spirit and scope of the invention. Thus, the breadth and scope of the present invention should not be limited by any of the above-described example embodiments, but should be defined only in accordance with the following claims and their equivalents.

What is claimed is:

1. A system comprising:
memory; and
one or more processors coupled to the memory, the one or more processors configured to:
detect whether a plurality of mobile devices are within a designated proximity to a location;
identify one or more books that discuss the location;
provide information regarding at least one book that is included in the one or more books via a user interface associated with each respective mobile device in a subset of the plurality of mobile devices based at least in part on the at least one book discussing the location and further based at least in part on each mobile device in the subset being within the designated proximity to the location;
determine that one or more mobile devices in the subset are within a second proximity to the location;
present an offer for one or more users to participate in a tour of a geographical area that includes the location via one or more user interfaces associated with the one or more respective mobile devices based at least in part on a determination that the one or more mobile devices are within the second proximity to the location;
provide the tour to a user corresponding to a designated mobile device based at least in part on an acceptance of the offer from the designated mobile device; and
provide directions for navigating through the geographical area in real-time to the user via the user interface associated with the designated mobile device.

2. The system of claim 1, wherein the one or more processors are configured to:
present the offer to tour the geographical area further based at least in part on a number of the one or more mobile devices reaching a specified threshold.

3. The system of claim 1, wherein the tour includes a plurality of locations; and
wherein the one or more processors are configured to:
enable a user of a mobile device that is included in the one or more mobile devices to control how far away the locations in the tour are from each other.

4. The system of claim 1, wherein the tour includes a plurality of locations; and
wherein the one or more processors are configured to:
enable a user of a mobile device that is included in the one or more mobile devices to select one or more locations that are to be included in the tour based at least in part on at least one of a designated genre, a designated book, or a designated author.

5. The system of claim 1, wherein the tour includes a plurality of locations; and
wherein the one or more processors are configured to:
determine one or more locations that are to be included in the tour based at least in part on information that is included in a profile of a user of a mobile device that is included in the one or more mobile devices.

6. The system of claim 1, wherein the one or more processors are configured to:
determine that each of one or more users corresponding to the one or more respective mobile devices has a profile that includes an attribute corresponding to an attribute of the tour; and
present the offer to tour the geographical area via the one or more user interfaces further based at least in part on a determination that each of the one or more users has a profile that includes an attribute corresponding to an attribute of the tour.

7. The system of claim 1, wherein the one or more processors are configured to:
cause a virtual element to be displayed via each respective user interface in the subset in response to the information being provided, each virtual element enabling a user of the respective mobile device to at least one of (a) share the information with at least one other person, (b) add an indicator that is associated with the information to a list of favorite content of the user, or (c) follow an author of the at least one book in a social network.

8. The system of claim 7, wherein the one or more processors are configured to:
cause a user to become a follower of the author of the at least one book in the social network based at least in part on selection of the respective virtual element by the user such that the one or more processors enable the user to receive at least one of the following in the social network:
(A) notifications of new books by the author of the at least one book,
(B) new locations that are discussed in books by the author of the at least one book.

9. The system of claim 1, wherein the one or more processors are configured to:
cause a virtual element to be displayed via each respective user interface in the subset in response to the information being provided, each virtual element enabling a user of the respective mobile device to indicate that the information violates a rule associated with a mobile application that is executing on at least one processor of the respective mobile device.

10. The system of claim 1, wherein the one or more processors are configured to:
provide analytics to an author of a book that discusses the location, the analytics specifying at least one of (a) a plurality of locations that are associated with the book, (b) persons who have provided at least one comment regarding at least one of the plurality of locations, or (c) demographic information regarding the persons who have provided at least one comment regarding at least one of the plurality of locations.

11. The system of claim 1, wherein the one or more processors receive payment from an author to include specified information regarding a specified book that is written by the author in information that is to be provided to mobile devices when the mobile devices come within the designated proximity to the location; and
wherein the information regarding the at least one book includes the specified information based at least in part on receipt of the payment from the author.

12. A system comprising:
memory; and
one or more processors coupled to the memory, the one or more processors configured to:
detect whether a plurality of mobile devices are within a designated proximity to a location;
identify one or more books that discuss the location;
provide information regarding at least one book that is included in the one or more books via one or more user interfaces associated with one or more respective mobile devices based at least in part on the at least one book discussing the location and further based at least in part on the one or more mobile devices being within the designated proximity to the location; and
cause a virtual element to be displayed on each of the one or more user interfaces that are associated with the one or more respective mobile devices, each virtual element enabling a user of the respective mobile device to schedule an event for participation by other users at the location.

13. The system of claim 12, wherein each virtual element enables the user of the respective mobile device to schedule the event at the location for free; and
wherein the one or more processors are configured to:
promote the event as featured content to other users based at least in part on payment of a fee from the user.

14. The system of claim 12, wherein the one or more processors are configured to:
provide a set number of promotions of the event to the user periodically based at least in part on receipt of a subscription fee from the user.

15. The system of claim 12, wherein the one or more processors are configured to:
provide a slider control that enables the user to establish a manner in which the event is promoted by enabling the user to set an extent to which an audience for the promotion is to be local with respect to one or more locations that are associated with the event and an extent to which profiles of users in the audience match subject matter of the event.

16. A method comprising:
detecting whether a plurality of mobile devices are within a designated proximity to a location;
identifying one or more books that discuss the location;
receiving payment from at least one of an author or a publisher to include specified information regarding a specified book that is written by the author in information that is to be provided to mobile devices when the mobile devices come within the designated proximity to the location; and
providing information regarding at least one book that is included in the one or more books via one or more user interfaces associated with one or more respective mobile devices based at least in part on the at least one book discussing the location and further based at least in part on the one or more mobile devices being within the designated proximity to the location,
wherein the information regarding the at least one book includes the specified information based at least in part on receipt of the payment from at least one of the author or the publisher; and
causing a virtual element to be displayed via each of the one or more user interfaces in response to the information being provided, each virtual element enabling a user of the respective mobile device to at least one of (a) share the specified information with at least one other person, (b) add an indicator that is associated with the specified information to a list of favorite content of the user, or (c) follow the author of the specified book in a social network.

17. The method of claim 16, wherein the information regarding the at least one book includes the specified information based at least in part on the author paying more than other authors for a book of the respective author to be promoted with regard to the location.

18. The method of claim 16, further comprising:
causing a user to become a follower of the author of the specified book in the social network based at least in part on selection of the respective virtual element by the user such that the user is enabled to receive at least one of the following in the social network:
(A) notifications of new books by the author of the specified book,
(B) new locations that are discussed in books by the author of the specified book.

19. A method comprising:
detecting whether a plurality of mobile devices are within a designated proximity to a location;
identifying one or more books that discuss the location;
providing information regarding at least one book that is included in the one or more books via one or more user interfaces associated with one or more respective mobile devices based at least in part on the at least one book discussing the location and further based at least in part on the one or more mobile devices being within the designated proximity to the location;
receiving payment from an author to promote a specified book that is written by the author, the specified book not discussing the location but discussing a second location;
receiving an indication that specifies an outer boundary of a geographical region corresponding to the location from a first user of a first mobile device of the plurality of mobile devices;
providing information regarding the specified book via a first user interface that is associated with the first mobile device based at least in part on receipt of the payment from the author and further based at least in part on the second location being within the outer boundary; and causing a virtual element to be displayed via the first user interface in response to the information being provided, the virtual element enabling the first user to at least one of (a) share the information with at least one other person, (b) add an indicator that is associated with the information to a list of favorite content of the first user, or (c) follow the author of the specified book in a social network.

20. The method of claim 19, wherein providing the information regarding the specified book comprises:
providing the information regarding the specified book based at least in part on the author paying more than other authors for a book of the respective author to be promoted with regard to the location.

21. A system comprising:
memory; and
one or more processors coupled to the memory, the one or more processors configured to:
detect whether a plurality of mobile devices are within a designated proximity to a location;
identify one or more books that discuss the location;
receive payment from at least one of an author or a publisher to include specified information regarding a specified book that is written by the author in information that is to be provided to mobile devices when the mobile devices come within the designated proximity to the location;
provide information regarding at least one book that is included in the one or more books via one or more user interfaces associated with one or more respective mobile devices based at least in part on the at least one book discussing the location and further based at least in part on the one or more mobile devices being within the designated proximity to the location,
wherein the information regarding the at least one book includes the specified information based at least in part on receipt of the payment from at least one of the author or the publisher; and
provide analytics to the author of the specified book, the analytics specifying at least one of (a) a plurality of locations that are associated with the specified book, (b) persons who have provided at least one comment regarding at least one of the plurality of locations, or (c) demographic information regarding the persons who have provided at least one comment regarding at least one of the plurality of locations.

* * * * *